US012620732B2

(12) United States Patent
Sato et al.

(10) Patent No.: US 12,620,732 B2
(45) Date of Patent: May 5, 2026

(54) CONNECTOR WITH SUBSTRATE

(71) Applicant: JAPAN AVIATION ELECTRONICS INDUSTRY, LIMITED, Tokyo (JP)

(72) Inventors: Yukiko Sato, Tokyo (JP); Yukitaka Tanaka, Tokyo (JP); Gota Kameyama, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 349 days.

(21) Appl. No.: 18/140,199

(22) Filed: Apr. 27, 2023

(65) Prior Publication Data

US 2024/0030633 A1 Jan. 25, 2024

(30) Foreign Application Priority Data

Jul. 25, 2022 (JP) ................................ 2022-118182

(51) Int. Cl.
*H01R 12/70* (2011.01)
*H01R 12/57* (2011.01)
(Continued)

(52) U.S. Cl.
CPC ......... *H01R 12/7064* (2013.01); *H01R 12/57* (2013.01); *H01R 12/712* (2013.01); *H01R 13/512* (2013.01); *H01R 13/639* (2013.01)

(58) Field of Classification Search
CPC .. H01R 12/7064; H01R 12/57; H01R 12/712; H01R 13/512; H01R 13/639;
(Continued)

(56) References Cited

U.S. PATENT DOCUMENTS 5,199,896 A 4/1993 Mosquera
5,211,577 A * 5/1993 Daugherty ......... H01R 13/2414 439/493
(Continued)

FOREIGN PATENT DOCUMENTS

CN 102655309 A 9/2012
CN 110556646 A 12/2019
(Continued)

OTHER PUBLICATIONS

Taiwan Intellectual Property Office, "Office Action with Search Report for Taiwanese Patent Application No. 112118554," Dec. 5, 2023.

*Primary Examiner* — Truc T Nguyen
(74) *Attorney, Agent, or Firm* — Kreative IP Management LLC; Fuiyeong Kim

(57) ABSTRACT

In a connector with substrate, a compression connector pressed against and connected to a connection target object and a substrate are attached. The connector with substrate includes a substrate; a compression connector disposed on the substrate and including contacts that are in contact with the substrate, a housing to which the contacts are fixed, and a cover shell that covers an upper surface portion of the housing; a provisional holding mechanism that provisionally holds the compression connector on the substrate; and a regular connection mechanism that, after the compression connector is provisionally held on the substrate by the provisional holding mechanism, regularly connects the compression connector to the substrate.

13 Claims, 31 Drawing Sheets

(51) Int. Cl.
*H01R 12/71* (2011.01)
*H01R 13/512* (2006.01)
*H01R 13/639* (2006.01)

(58) Field of Classification Search
CPC ........................ H01R 13/6275; H01R 13/6594; H01R 12/79; H01R 12/85; H01R 12/714; H01R 12/716; H01R 13/73
See application file for complete search history.

(56) References Cited

U.S. PATENT DOCUMENTS

| | | | | | |
|---|---|---|---|---|---|
| 5,268,820 | A * | 12/1993 | Tseng | H01R 12/7029 | 439/74 |
| 5,679,009 | A * | 10/1997 | Okumura | H01R 12/7005 | 439/573 |
| 6,846,115 | B1 * | 1/2005 | Shang | G02B 6/4277 | 439/91 |
| 7,112,067 | B1 * | 9/2006 | Korsunsky | H01R 12/52 | 439/76.1 |
| 7,442,047 | B1 * | 10/2008 | Schmidgall | H01R 12/62 | 439/67 |
| 8,403,681 | B2 * | 3/2013 | Chien | H05K 7/1061 | 439/91 |
| 10,826,208 | B1 | 11/2020 | Shotter | | |
| 2004/0033717 | A1 * | 2/2004 | Peng | H01R 12/57 | 439/495 |
| 2006/0121781 | A1 * | 6/2006 | Zhang | H01R 13/658 | 439/607.31 |
| 2006/0240697 | A1 * | 10/2006 | Cronch | H01R 12/79 | 439/260 |
| 2007/0184699 | A1 * | 8/2007 | Yu | H01R 12/714 | 439/248 |
| 2012/0225575 | A1 | 9/2012 | Tagawa et al. | | |
| 2018/0183206 | A1 * | 6/2018 | Nishita | H01R 12/57 | |
| 2019/0348784 | A1 * | 11/2019 | Yufu | H01R 13/6591 | |
| 2020/0259281 | A1 | 8/2020 | Kim | | |

FOREIGN PATENT DOCUMENTS

| | | | | |
|---|---|---|---|---|
| CN | 210156578 U | | 3/2020 | |
| CN | 111630723 A | | 9/2020 | |
| DE | 102012106476 A1 | | 6/2014 | |
| EP | 3852201 A1 | | 7/2021 | |
| FR | 3027163 | * | 4/2016 | H01R 12/79 |
| JP | 2000-012123 A | | 1/2000 | |

* cited by examiner

Prior Art

CONNECTOR WITH SUBSTRATE

CROSS-REFERENCE TO RELATED APPLICATION

The present application is based on and claims priority from Japanese Patent Application No. 2022-118182 filed on Jul. 25, 2022, the disclosure of which is hereby incorporated by reference herein in its entirety.

BACKGROUND OF THE INVENTION

Field of the Invention

The present invention relates to a connector with substrate.

Description of the Related Art

A connector of a compression type pressed against and connected to a connection target object such as a substrate has been publicly known. The structure of the connector of this type is disclosed in, for example, Japanese Patent Application Laid-Open No. 2000-12123 (Patent Literature 1). The connector of the compression type of the related art disclosed in Patent Literature 1 described below is configured as an electric connector (1) including a contact (20) including an elastic spring section (23) as shown in FIG. 31. In the electric connector (1), a plurality of contacts (20) are disposed in an arrayed state.

The contact (20) includes a substrate connecting section (22) solder-connected to a first circuit board (30) and a contact section (24) that is in contact with a second circuit board (40). The elastic spring section (23) having a spring property is provided between the substrate connecting section (22) and the contact section (24). The second circuit board (40) is pressed from the upward side of the contact (20) attached on the first circuit board (30) by solder-connection, whereby the elastic spring section (23) of the contact (20) exerts the spring property to generate a contact pressure between the second circuit board (40) and the contact (20). Note that reference numerals and signs concerning explanation of the related art document are distinguished from those in embodiments of the present invention by being parenthesized.

In the compression connector of the related art, screwing has been used for attachment (fixing) to the substrate.

However, when the compression connector is fixed to the substrate by the screwing, in general, a method of attaching nuts from a substrate surface on the opposite side of a connector mounting surface side on which the connector is mounted and tightening screws from the connector mounting surface side is adopted. In the case of the related art, since a provisional holding mechanism for provisionally holding the connector on the substrate is absent, an operator needs to press the connector and the nuts by hand or the like while tightening the screws and, therefore, there is a problem that it is hard to perform connector attaching (fixing) work. That is, since the nuts, which are separate components, are necessary besides the screws in a fixing structure for the compression connector and the substrate by the screwing of the related art, problems exist such as that the nuts are likely to be lost or work manhours increase.

In the related art, since the compression connector and the substrate are not provisionally held when the screwing is performed, positions of the compression connector and the substrate are not determined because of repulsion with the substrate by the contact. It is necessary to press the compression connector to the substrate side with a hand or a jig when the screwing is performed. In other words, in the compression connector of the related art, it has been demanded to realize a configuration for performing secure attachment while improving workability of attachment in the attachment (fixing) to the substrate.

Accordingly, an object of the present invention is to, by proposing a configuration that, when fixing a compression connector and a substrate, can realize a state in which the compression connector is provisionally held on the substrate and, thereafter, perform regular connection such as screwing, realize a configuration for performing secure attachment while improving workability of attachment (fixing) of the compression connector to the substrate.

SUMMARY OF THE INVENTION

A connector with substrate according to the present invention is a connector with substrate in which a compression connector pressed against and connected to a connection target object and a substrate are attached, the compression connector including contacts that are in contact with the substrate, a housing to which the contacts are fixed, and a cover shell that covers an upper surface portion of the housing, the connector with substrate including: a provisional holding mechanism that provisionally holds the compression connector on the substrate; and a regular connection mechanism that, after the compression connector is provisionally held on the substrate by the provisional holding mechanism, regularly connects the compression connector to the substrate.

That is, the connector with substrate according to the present invention includes the regular connection mechanism that attaches the compression connector and the substrate using screws and further includes the provisional holding mechanism that can provisionally hold the connector on the substrate at a stage before the screws are tightened. Therefore, a simple and secure fixed state is obtained. In the connector with substrate according to the present invention, since the provisional holding is performed before the regular connection for tightening the screws, screwing work can be easily performed. Therefore, the connector with substrate is not dropped or lost, unlike the screws and the nuts of the related art.

In the connector with substrate according to the present invention, the provisional holding mechanism can be configured by: a lock claw of a lock piece formed on the cover shell of the compression connector; and a cage fixed to the substrate, one or more lock holes for housing the lock claw can be present in the cage, the compression connector can be provisionally held by engagement of the lock claw and the lock hole when the compression connector is inserted into the cage fixed to the substrate, and the regular connection mechanism that regularly connects the substrate and the compression connector after the provisional holding can be screwing performed using screws.

In the connector with substrate according to the present invention, a projection for strengthening against deformation can be formed on the cover shell.

In the connector with substrate according to the present invention, a reinforcement plate for strengthening against deformation can be attached to the cover shell.

In the connector with substrate according to the present invention, the lock piece can fix a front surface side or a side surface side of the compression connector.

In the connector with substrate according to the present invention, one or more of the screws can be present and can be disposed in any positions of the compression connector.

Further, in the connector with substrate according to the present invention, the provisional holding mechanism can be configured by: the cover shell on which at least one or more holding pieces that control a position in a vertical direction with respect to the substrate are formed; and a holding hole formed in the substrate, the holding piece being insertable into the holding hole, and the regular connection mechanism that regularly connects the substrate and the compression connector after the provisional holding can be screwing performed using screws.

In the connector with substrate according to the present invention, the holding piece can project from the cover shell while having a U shape or an L shape, and a holding claw can be formed at a distal end on the projection side of the U shape or the L shape, and the holding claw can be caught in the holding hole formed in the substrate to receive contact reaction in the vertical direction applied to the substrate.

In the connector with substrate according to the present invention, the holding piece can be formed by projecting from a top surface of the cover shell in the vertical direction on an opposite side of the substrate and then being bent in a reverse U shape and a distal end of the holding piece extending to the substrate side, and the holding claw can be formed at the distal end, and the holding claw can be caught in the holding hole formed in the substrate to receive contact reaction in the vertical direction applied to the substrate.

In the connector with substrate according to the present invention, a protrusion for strengthening against deformation can be formed on the cover shell.

In the connector with substrate according to the present invention, a reinforcement plate for strengthening against deformation can be attached to the cover shell.

In the connector with substrate according to the present invention, the holding piece can be formed by being bent in an L shape from a top surface of the cover shell in a substrate direction and a distal end of the holding piece extending to the substrate side, a curved shape portion can be formed at the distal end, and the curved shape portion can be fit in the holding hole of the substrate to receive contact reaction in the vertical direction applied to the substrate.

Further, in the connector with substrate according to the present invention, the compression connector can include a bottom shell that covers a lower surface portion of the housing.

According to the present invention, it is possible to propose a configuration that, when fixing a compression connector and a substrate, can realize a state in which the compression connector is provisionally held on the substrate and, thereafter, perform regular connection by screwing or the like. Therefore, according to the present invention, it is possible to perform secure attachment while improving workability of attachment (fixing) of the compression connector to the substrate.

DETAILED DESCRIPTION OF THE PREFERRED EMBODIMENTS

Preferred embodiments for carrying out the present invention are explained below with reference to the drawings. Note that, in the figures, a first direction, a second direction, and a third direction are defined for convenience of explanation. In this specification, the first direction is the front-rear direction. In the figures, the front-rear direction is shown as an X direction. In particular, a forward direction is represented as a +X direction and a rearward direction is represented as a −X direction. In this specification, the second direction is the left-right direction. In the figures, the left-right direction is shown as a Y direction. In particular, the right direction is represented as a +Y direction and the left direction is represented as a −Y direction. Further, in this specification, the third direction is the up-down direction. In the figures, the up-down direction is shown as a Z direction. In particular, an upward direction is represented as +Z direction and a downward direction is represented as −Z direction. However, the X direction, which is the first direction, the Y direction, which is the second direction, and the Z direction, which is the third direction, defined in this specification do not limit directions at the time of use of connectors with substrate in the embodiments. The connectors with substrate in the embodiments can be used in all directions.

The embodiments described below do not limit the inventions according to the claims. Not all of combinations of characteristics explained in the embodiments are essential for the solution of the invention.

First Embodiment

Figure 1:
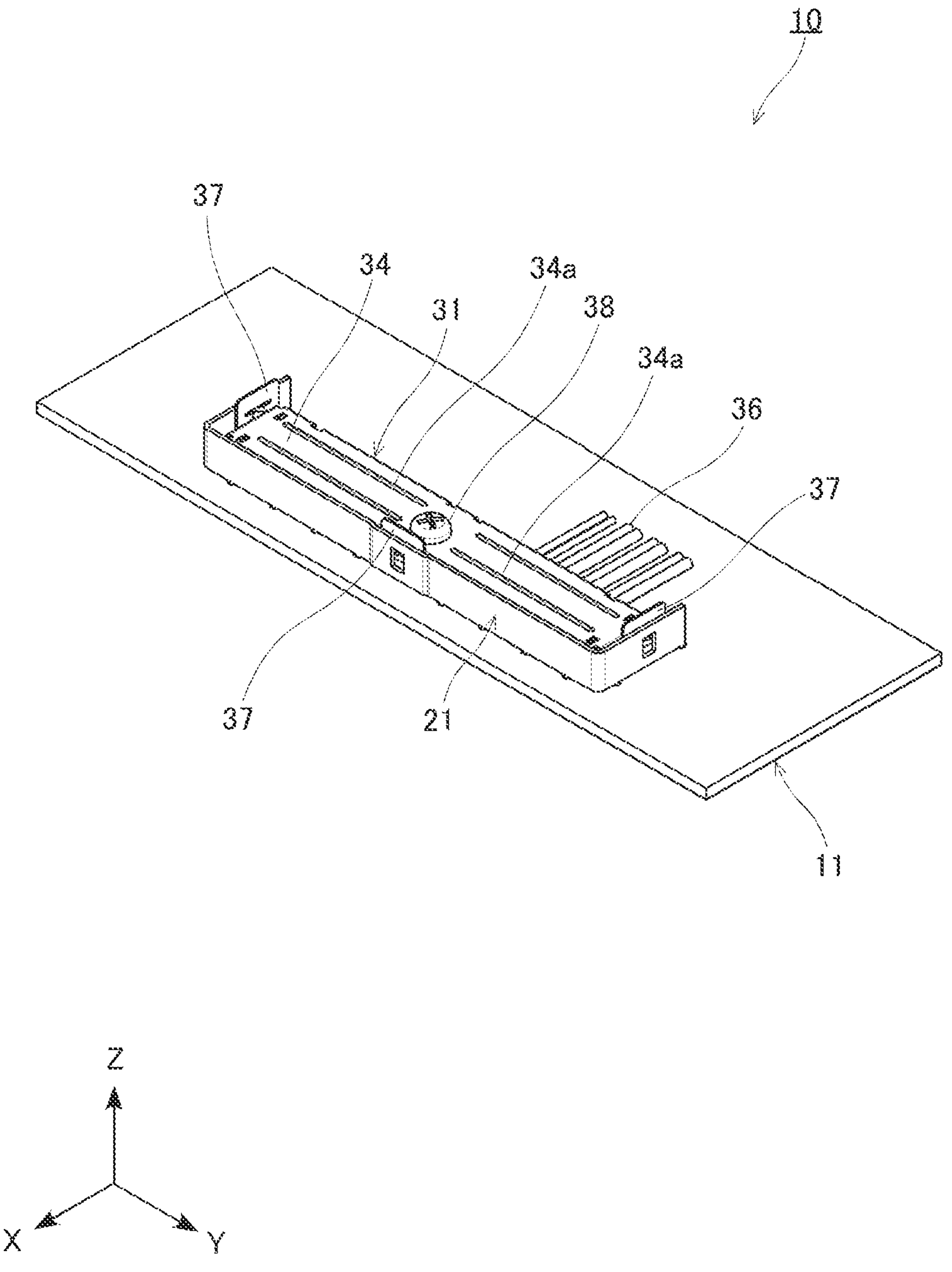
FIG. 1 is an exterior perspective view of a connector with substrate according to a first embodiment viewed from the front upper right.
Figure 2:
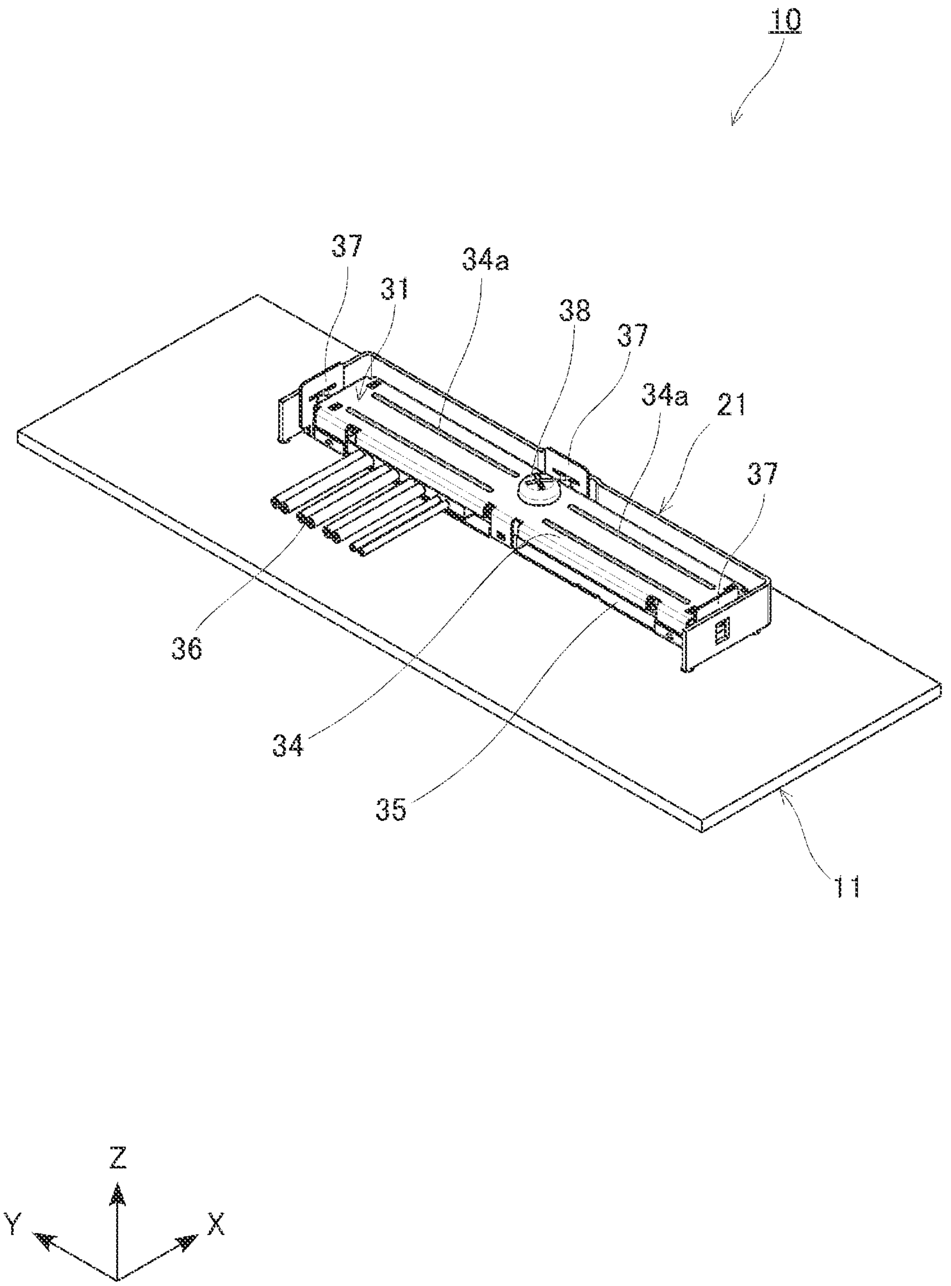
FIG. 2 is an exterior perspective view of the connector with substrate according to the first embodiment viewed from the rear upper left.

A configuration of a connector with substrate 10 according to a first embodiment is explained with reference to FIGS. 1 to 14. The connector with substrate 10 according to the first embodiment includes, as shown in FIGS. 1 to 3, a substrate 11, a cage 21 installed on the upper surface of the substrate 11, and a compression connector 31 attached to the substrate 11 via the cage 21.

The substrate 11 includes a not-shown printed circuit and the like. The substrate 11 is electrically connected to the compression connector 31 attached to the upper surface of the substrate 11 to be configured to be able to deliver an electric signal, power supply power, and the like.

Figure 3:
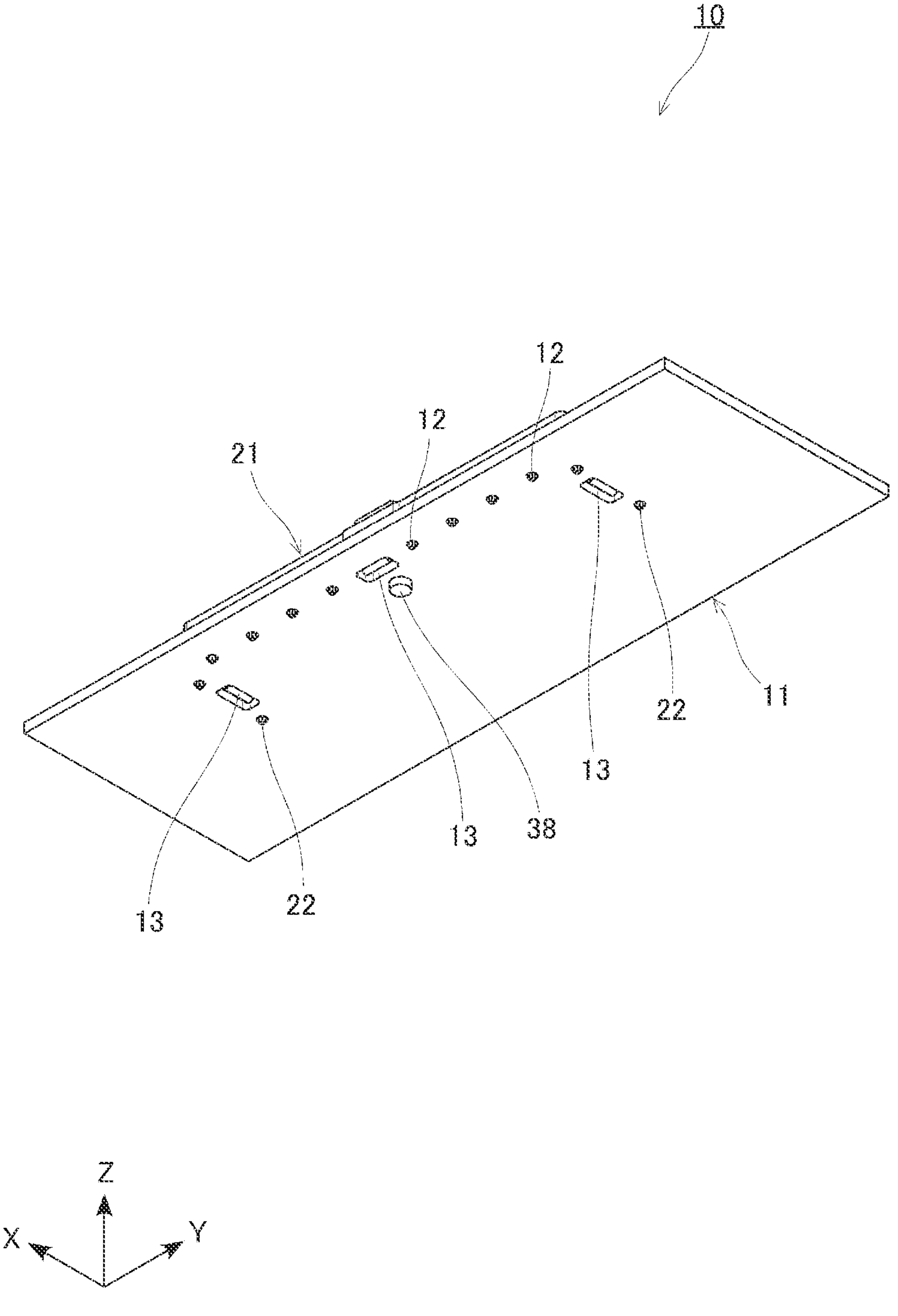
FIG. 3 is an exterior perspective view of the connector with substrate according to the first embodiment viewed from the front lower right.
Figure 4:
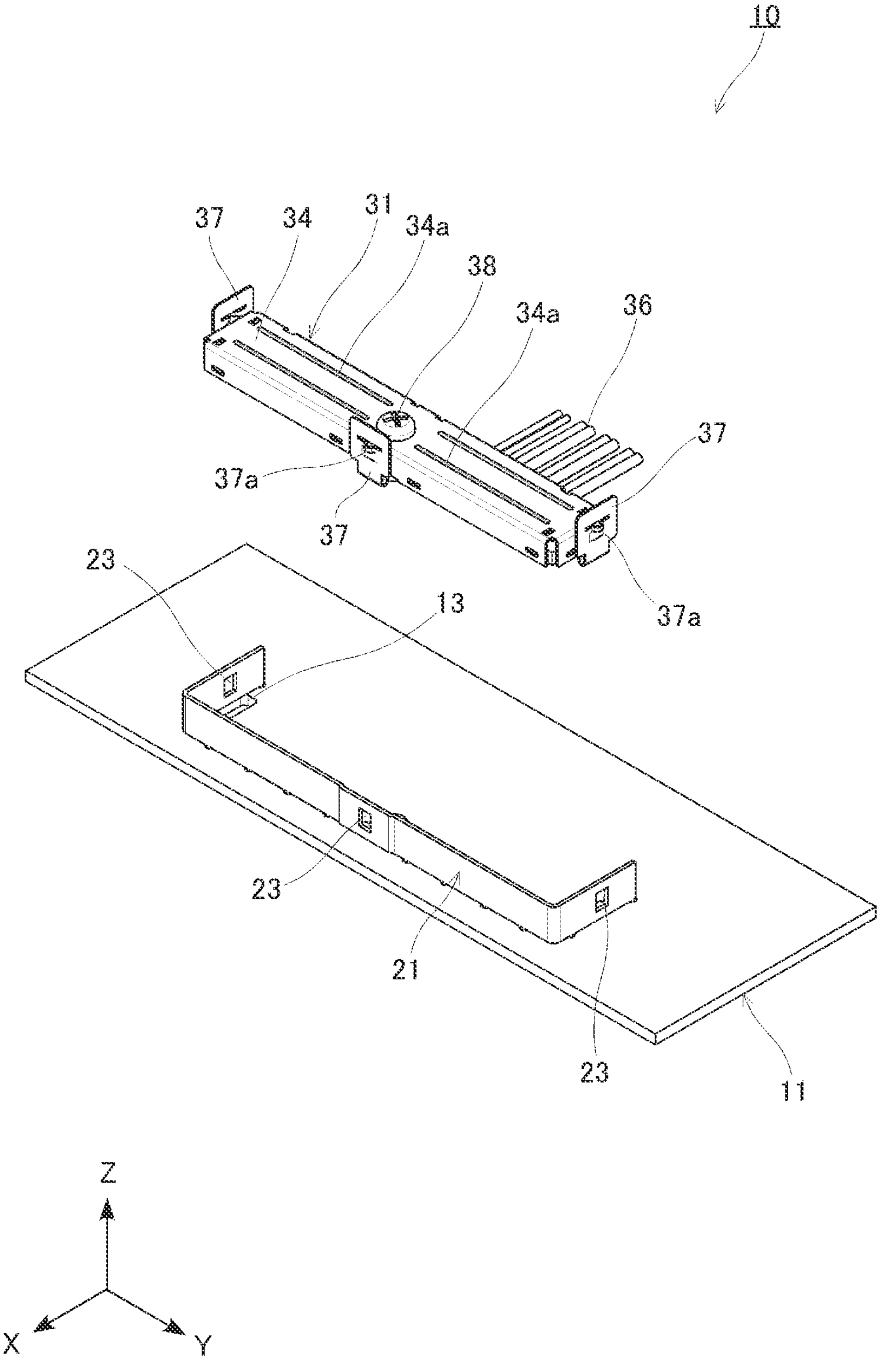
FIG. 4 is an exterior perspective view of a state in which a compression connector is detached from a cage fixed to a substrate in the connector with substrate according to the first embodiment, the state being viewed from the front upper right.
Figure 5:
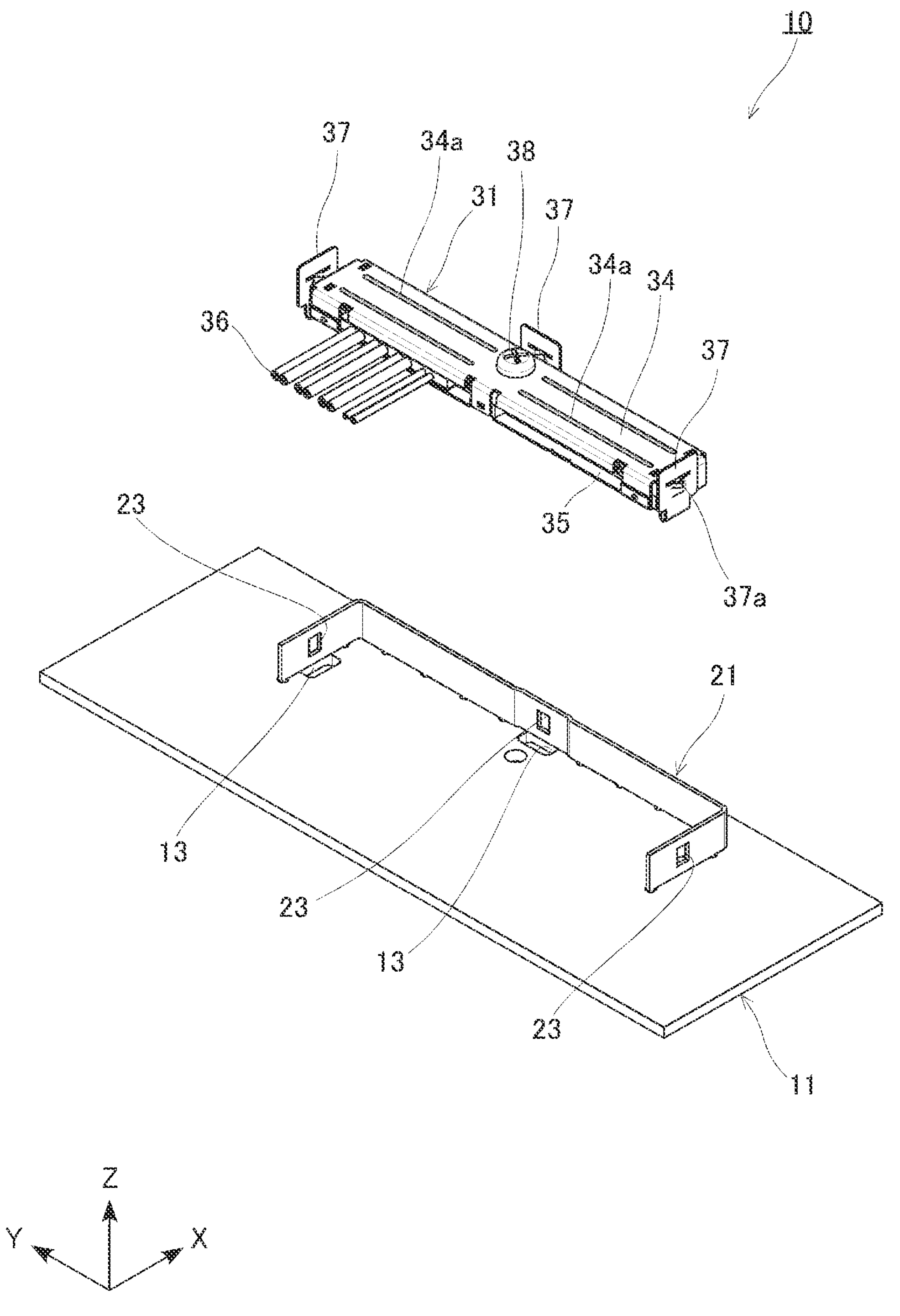
FIG. 5 is an exterior perspective view of the state in which the compression connector is detached from the cage fixed to the substrate in the connector with substrate according to the first embodiment, the state being viewed from the rear upper left.
Figure 6:
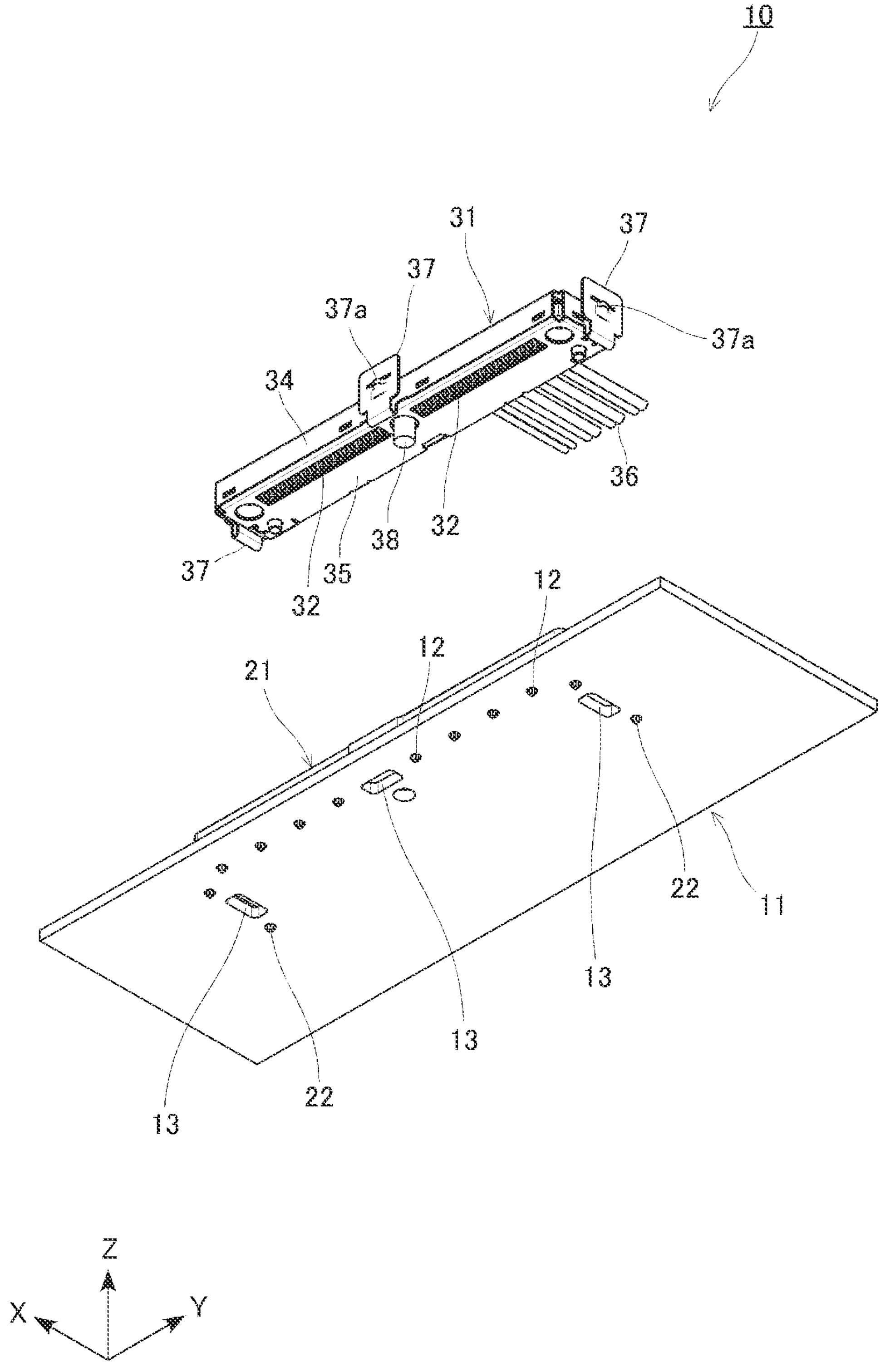
FIG. 6 is an exterior perspective view of the state in which the compression connector is detached from the cage fixed to the substrate in the connector with substrate according to the first embodiment, the state being viewed from the front lower right.
Figure 7:
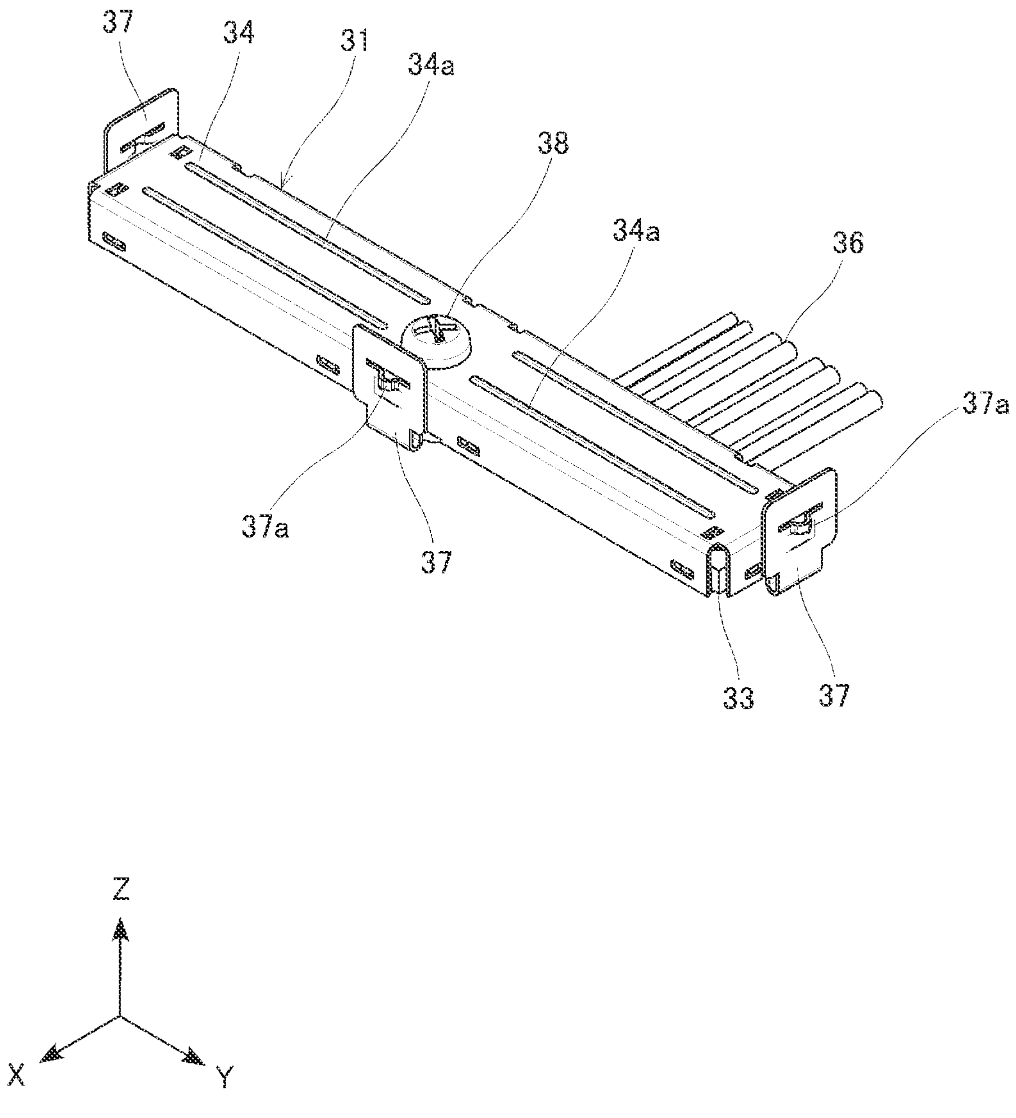
FIG. 7 is an exterior perspective view of the compression connector according to the first embodiment viewed from the front upper right.

As shown in, in particular, FIG. 3, a plurality of attachment holes 12 and a plurality of opening sections 13 are formed in the substrate 11. A plurality of leg sections 22 included in the cage 21 explained below are inserted into the plurality of (in the first embodiment, twelve) attachment holes 12 to fix the cage 21 to the substrate 11. The plurality of (in the first embodiment, three) opening sections 13 are formed such that, when the compression connector 31 explained below is fixed to the substrate 11, end portions on the lower side of lock pieces 37 included in the compression connector 31 enters the opening sections 13. Therefore, fixing and connection of the substrate 11 and the compression connector 31 is not hindered by the presence of the opening sections 13.

Figure 13:
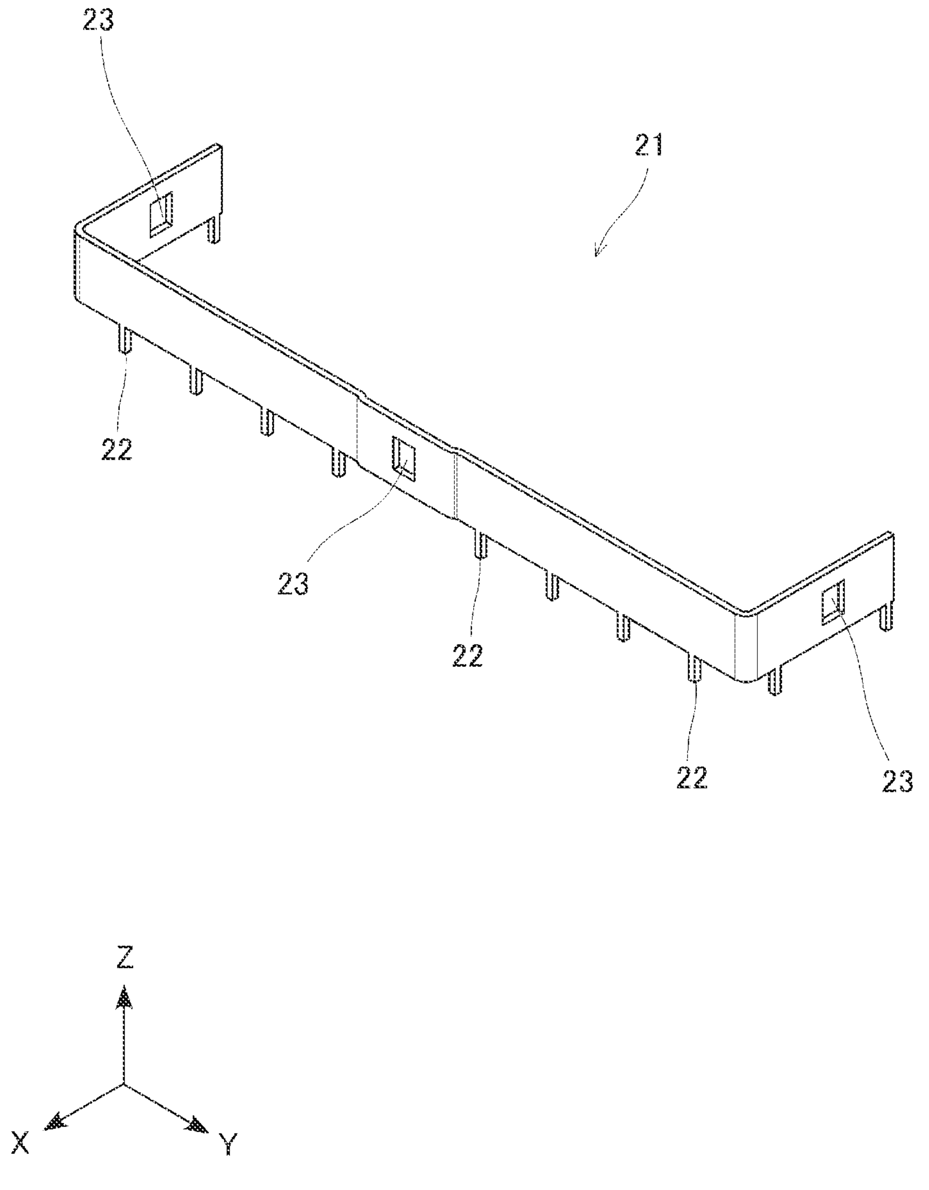
FIG. 13 is an exterior perspective view of the cage according to the first embodiment viewed from the front upper right.
Figure 14:
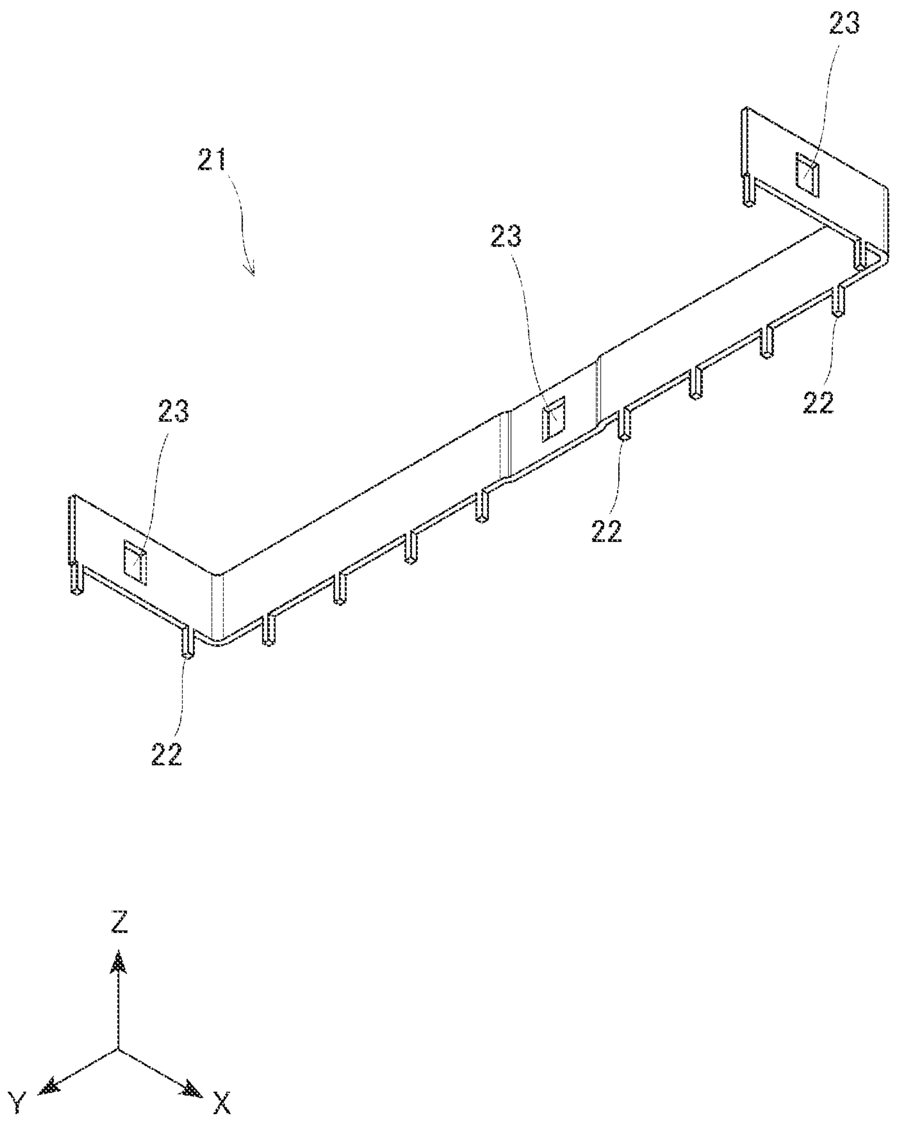
FIG. 14 is an exterior perspective view of the cage according to the first embodiment viewed from the rear lower left.
Figure 15:
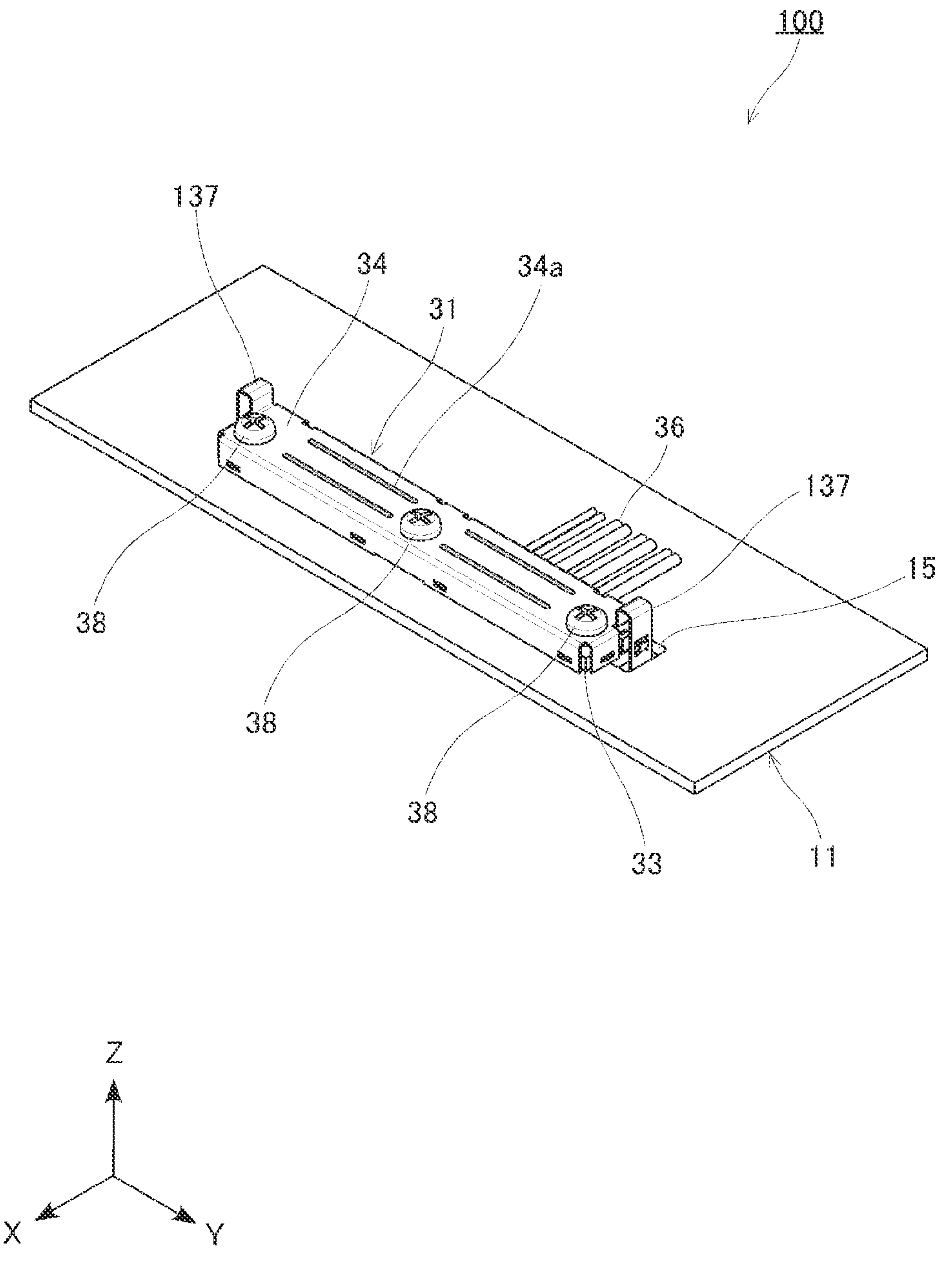
FIG. 15 is an exterior perspective view of a connector with substrate according to a second embodiment viewed from the front upper right.
Figure 16:
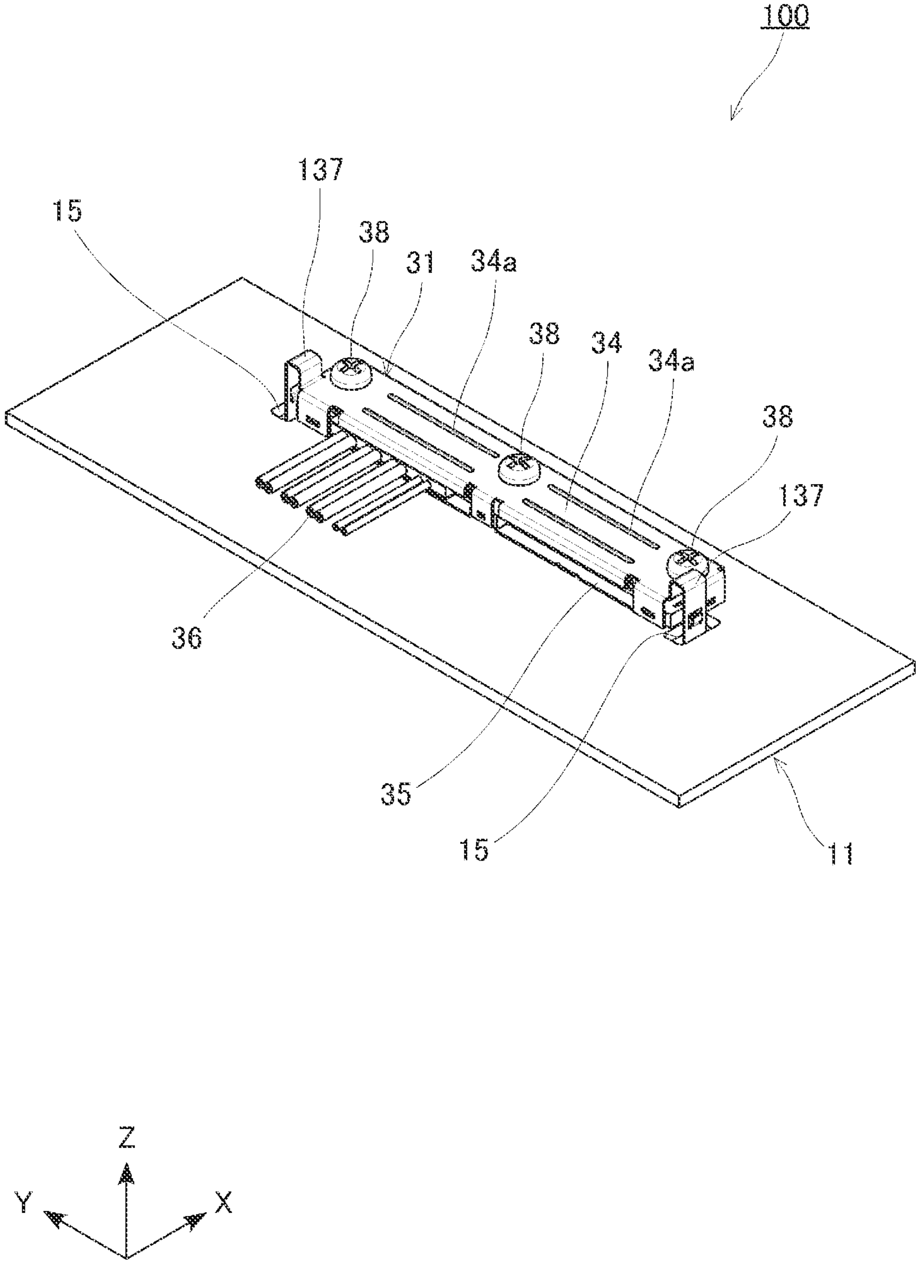
FIG. 16 is an exterior perspective view of the connector with substrate according to the second embodiment viewed from the rear upper left.

As shown in FIGS. 13 and 14, the cage 21 is a member obtained by bending a flat metal plate material to be formed in a substantially channel-like shape. Twelve leg sections 22 are formed on the bottom surface side of the cage 21 to extend downward. As explained above, the twelve leg sections 22 are inserted into the plurality of attachment holes 12 formed in the substrate 11 to fix the cage 21 to the substrate 11.

In the cage 21, three lock holes 23 in total are formed, one in the front and one each in each of the left and right directions. The three lock holes 23 are components used to provisionally hold the compression connector 31 to function as the provisional holding mechanism of the present invention.

The compression connector 31 includes, as shown in FIGS. 7 to 12, contacts 32 that are in contact with the substrate 11, a housing 33 to which the contacts 32 are fixed, a cover shell 34 that covers the upper surface portion of the housing 33, and a bottom shell 35 that covers the lower surface portion of the housing 33.

Figure 8:
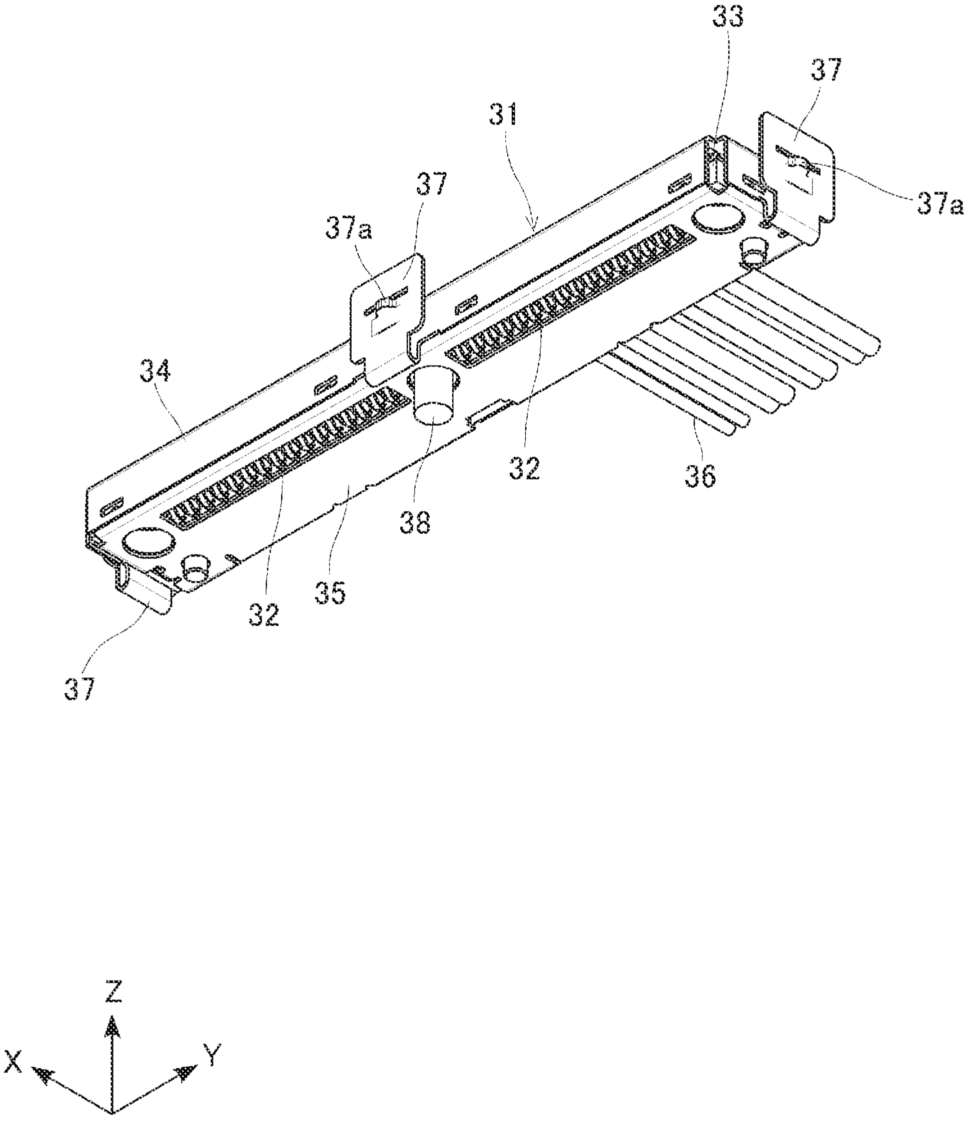
FIG. 8 is an exterior perspective view of the compression connector according to the first embodiment viewed from the front lower right.
Figure 9:
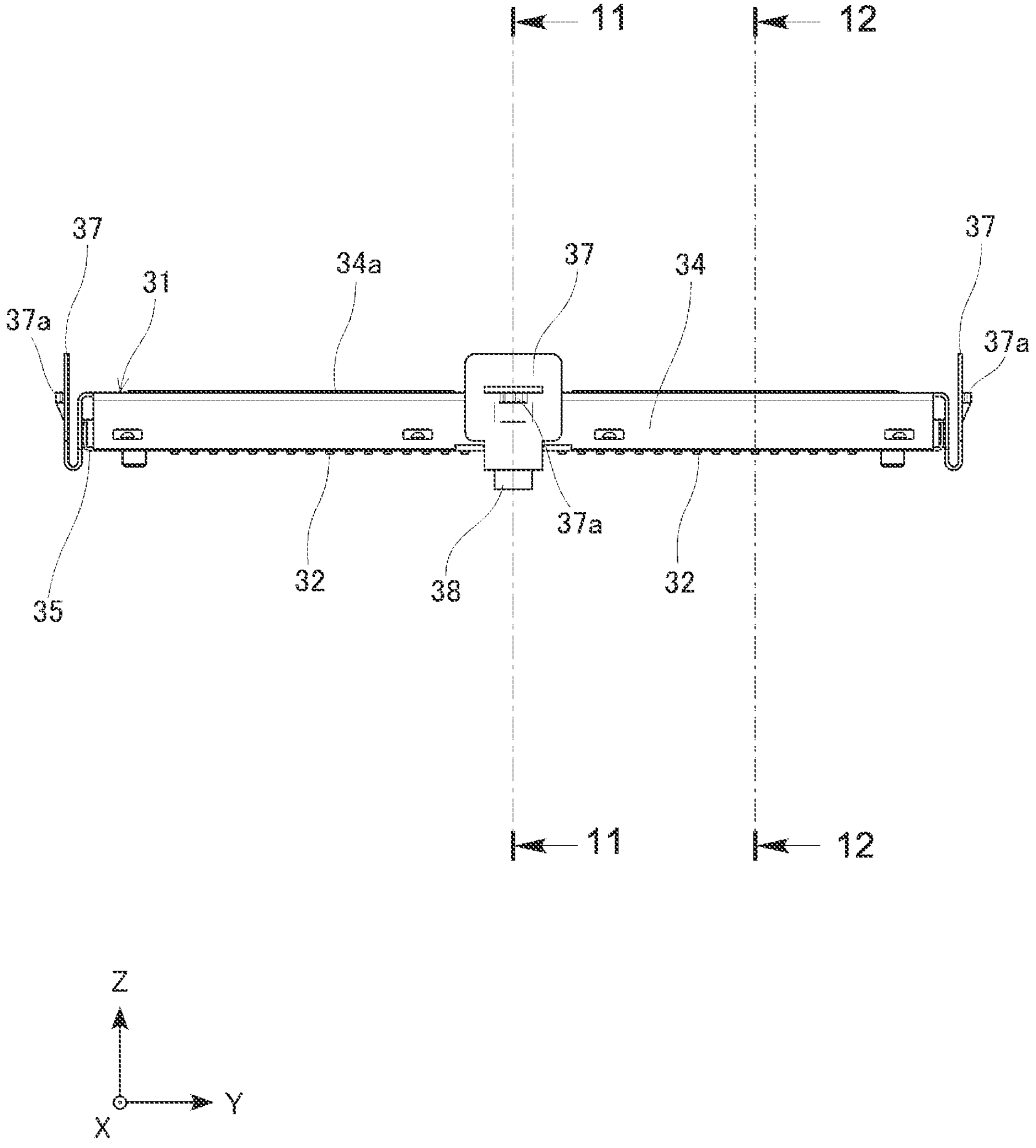
FIG. 9 is a front view of the compression connector according to the first embodiment.

As shown in, in particular, FIGS. 8 and 9, a plurality of contacts 32 are disposed to be laterally arranged in the left-right direction.

Figure 12:
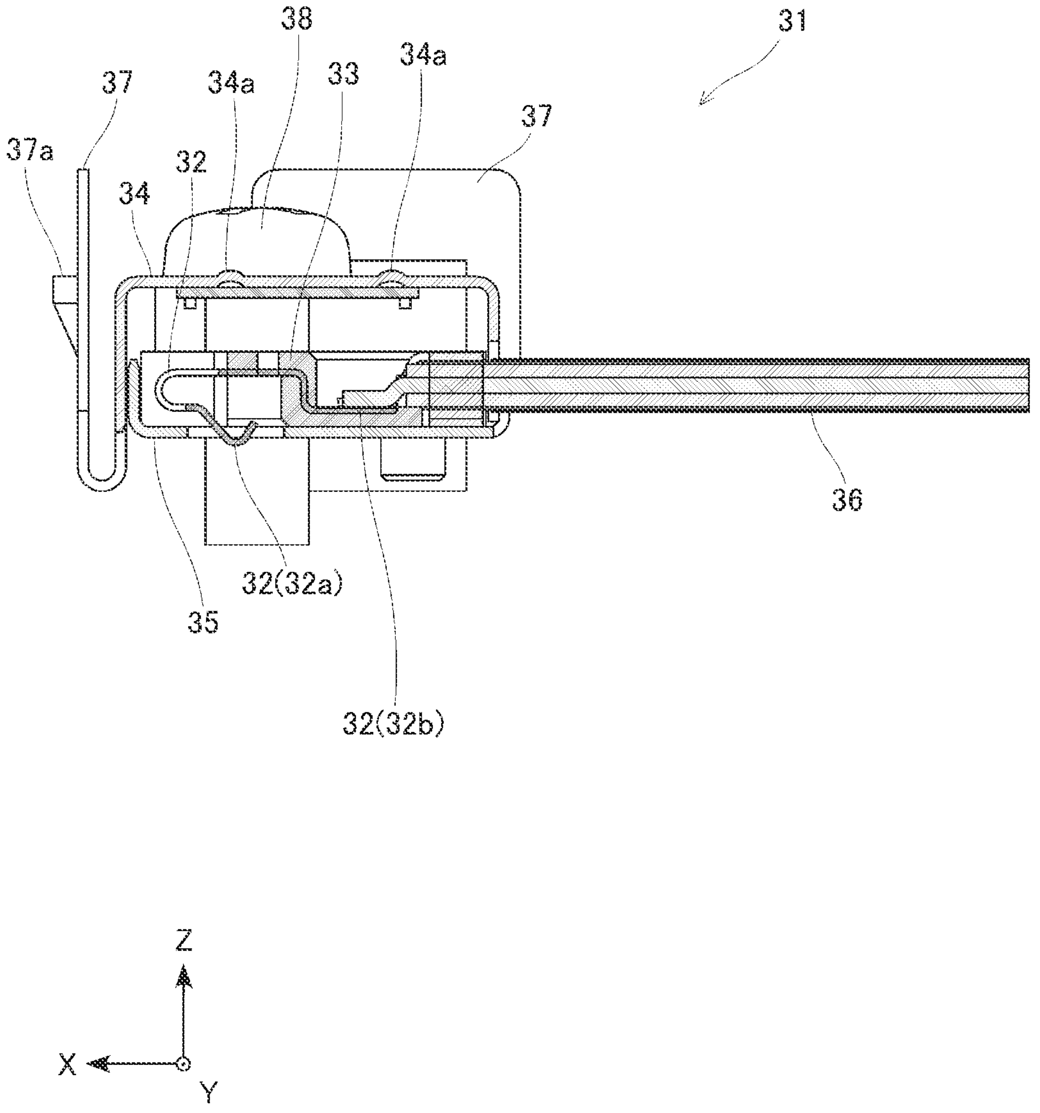
FIG. 12 is a longitudinal sectional view taken along line 12-12 in FIG. 9.

Each of the plurality of contacts 32 is fixed to the housing 33 as shown in FIG. 12. A front end portion **32*a* of the contact 32 curves to be formed in a shape having spring elasticity. That is, when the compression connector 31 is not in contact with the substrate 11, the front end portion 32*a* of the contact 32 is disposed to project downward from the bottom surface of the bottom shell 35 (a state shown in FIG. 12). Therefore, when the bottom surface of the bottom shell 35 configuring the compression connector 31 is pressed in the −Z direction against the upper surface of the substrate 11, the front end portions 32*a* of the plurality of contacts 32 projecting downward from the bottom surface of the bottom shell 35 are pushed into the position of the bottom surface of the bottom shell 35 while applying force by the spring elasticity to the upper surface of the substrate 11. That is, the front end portions 32*a* of the plurality of contacts 32 receive force in the +Z direction. Therefore, when the compression connector 31 is attached to the substrate 11, since each of the plurality of contacts 32 is pressed against the upper surface of the substrate 11 by the force by the spring elasticity, for example, the not-shown printed circuit and the like disposed on the upper surface of the substrate 11 and the plurality of contacts 32** can maintain a stable and secure connection state.

On the other hand, a rear end portion **32*b* of the contact 32 has a linear shape extending straight. As shown in FIG. 12, an electric cable 36** is connected to the rear end portion

32*b* of the contact 32 by solder or the like. Therefore, an electric signal, power supply power, and the like from the outside are transmitted to the substrate 11 side via the electric cable 36 and the contact 32.

Note that, concerning the members configuring the compression connector 31 in the first embodiment, the plurality of contacts 32 are made of a conductive metal material and the housing 33 that fixes the plurality of contacts 32 is made of a nonconductive resin material or the like. The cover shell 34 that covers the upper surface portion of the housing 33 and the bottom shell 35 that covers the lower surface portion of the housing 33 are combined, in a state in which the housing 33 is included between the cover shell 34 and the bottom shell 35, in the up-down direction to form an outline shape of the compression connector 31. The cover shell 34 and the bottom shell 35 protect the housing 33, in which the plurality of contacts 32 that receive energization from the electric cable 36 are embedded, by being disposed to enclose the outer circumference of the housing 33 in which the plurality of contacts 32 are embedded. The protection also includes electric and magnetic protection such as an electromagnetic shield in addition to physical protection from an external environment.

In the cover shell 34 in the first embodiment, three lock pieces 37 are installed as shown in FIGS. 7 to 12. In the cover shell 34 in the first embodiment, among the three lock pieces 37, one lock piece 37 is disposed in the front center position of the cover shell 34, one lock piece 37 is disposed in a position closer to the right side rear of the cover shell 34, and one lock piece 37 is disposed in a position closer to the left side rear of the cover shell 34.

Figure 10:
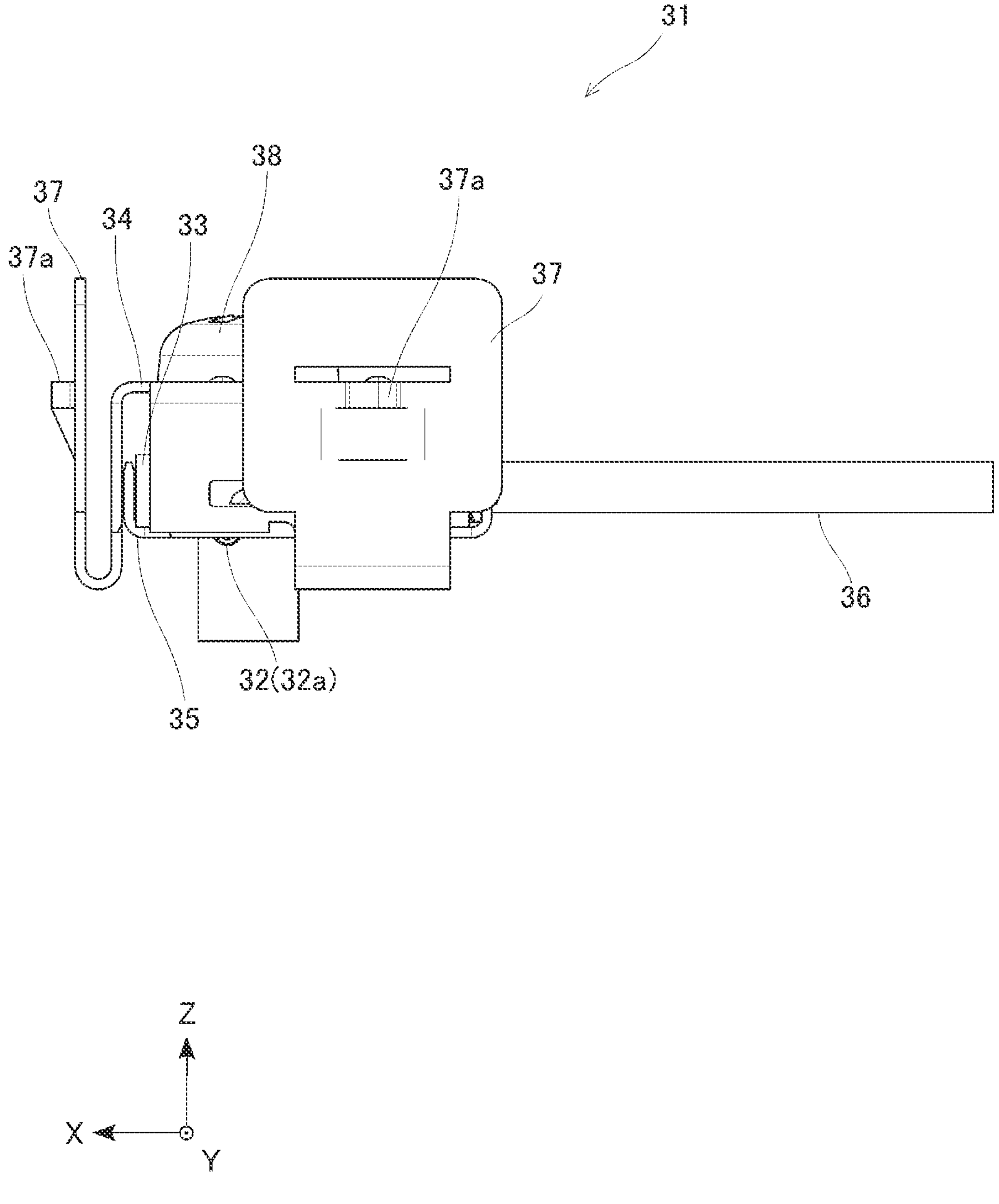
FIG. 10 is aright side view of the compression connector according to the first embodiment.
Figure 11:
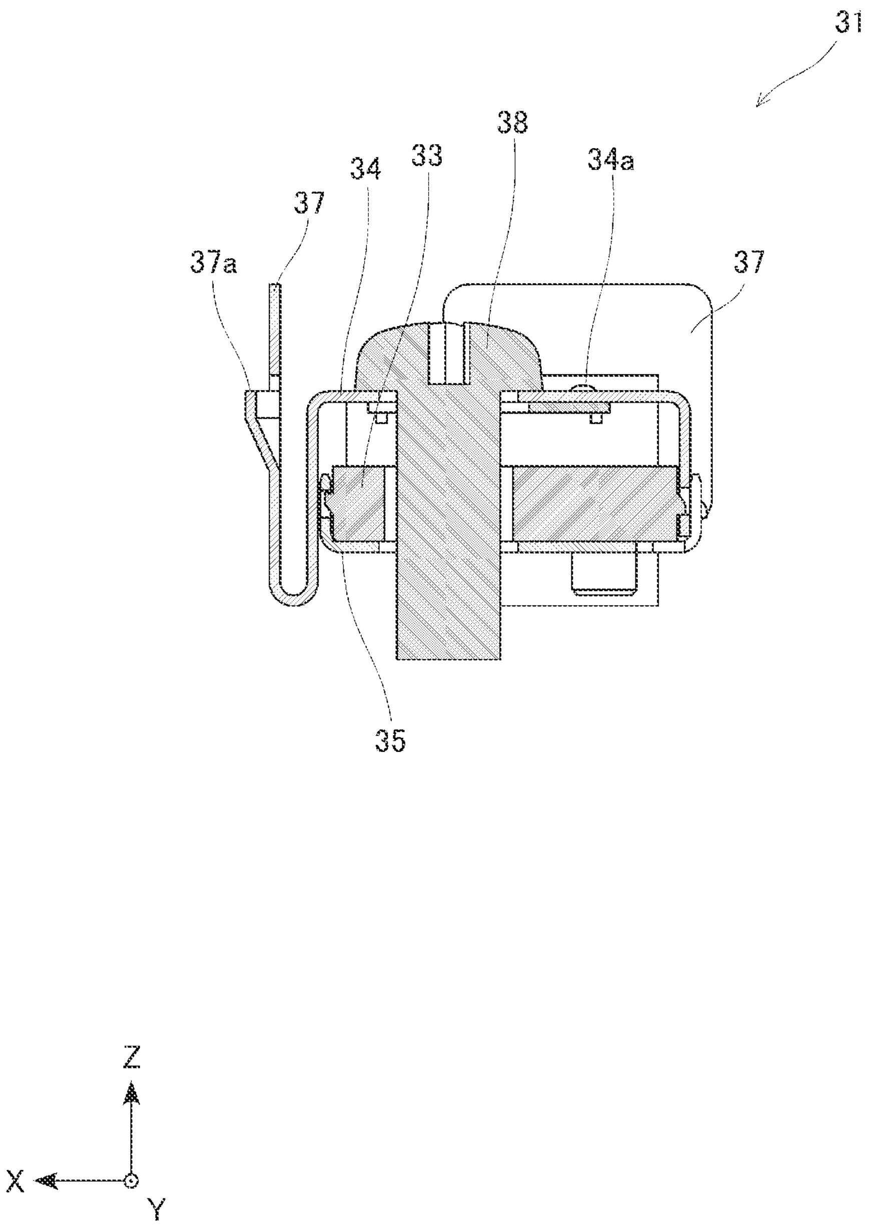
FIG. 11 is a longitudinal sectional view taken along line 11-11 in FIG. 9.

As shown in, in particular, FIGS. 9 and 10, the three lock pieces 37 have a shape bent in a substantially U shape, in parts extending downward from the front surface and the left and right side surfaces of the cover shell 34, and thereafter rising upward. In the center positions of the rising shape parts, lock claws 37*a* projecting outward in the lock pieces 37 are formed. The lower sides of the lock claws 37*a* are slopes and the upper sides of the lock claws 37*a* are formed in a cubic shape. That is, the lock claws 37*a* are formed to gradually project from the surfaces of the lock pieces 37 upward from the bottom positions. The three lock claws 37*a* are disposed in positions corresponding to formation positions of the three lock holes 23 formed in the cage 21 explained above. Therefore, when the compression connector 31 is moved in the −Z direction toward the cage 21 disposed on the upper surface of the substrate 11 and is pressed against the cage 21, the lock claws 37*a* gradually enter the lock holes 23, with the lock pieces 37 being pushed to the cover shell 34 side, with force by the spring elasticity by the shape bent in the substantially U shape of the lock pieces 37 and action by the shape of the slopes on the lower sides of the lock claws 37*a*. Finally, an outward pressing force by the spring elasticity exerted by the lock pieces 37 acts, the lock claws 37*a* are completely fit in the lock holes 23, and engagement of the cover shell 34 with the cage 21 is realized. This state is a state in which the compression connector 31 is provisionally held on the substrate 11. That is, the lock claws 37*a* respectively included in the three lock pieces 37 and the three lock holes 23 formed in the cage 21 configure the provisional holding mechanism of the present invention.

In the connector with substrate 10 according to the first embodiment, as explained above, after the state in which the compression connector 31 is provisionally held on the substrate 11 is realized, the regular connection of the compression connector 31 to the substrate 11 is executed using the one screw 38 included in the compression connector 31. Specifically, a screw head of the one screw 38 is disposed in the upper surface side center position of the cover shell 34 configuring the compression connector 31 and a screw distal end portion is pierced through to the bottom surface side of the substrate 11. Therefore, by fastening a not-shown nut to the screw distal end portion pierced through to the bottom surface side of the substrate 11, it is possible to regularly connect the compression connector 31 to the substrate 11. That is, screwing performed using the one screw 38 and the not-shown nut functions as the regular connection mechanism of the present invention.

Note that, in the first embodiment, force in connection is applied to the cover shell 34 in both of a state in which the compression connector 31 is provisionally held on the substrate 11 and a state in which the compression connector 31 is regularly connected to the substrate 11. Since the cover shell 34 is formed by the thin metal plate having the shape long in the left-right direction, the cover shell 34 preferably has structure for preventing deformation of the cover shell 34 itself when receiving force for connection and fixing. Therefore, in the cover shell 34 according to the first embodiment, a plurality of lines of projections 34*a* extending in the left-right direction are formed on the upper surface. Strengthening against deformation of the cover shell 34 itself can be achieved by action of the shape of the plurality of lines of projections 34*a*.

A preferred embodiment of the present invention is explained above. However, the technical scope of the present invention is not limited to the scope described in the first embodiment. Various changes or improvements can be added to the first embodiment.

For example, in the first embodiment explained above, the strengthening against deformation of the cover shell 34 itself is achieved by forming the plurality of lines of projections 34*a* extending in the left-right direction on the upper surface of the cover shell 34. However, in the present invention, means other than forming the projections 34*a* may be adopted if the means is configured to have the same action effects. The strengthening against deformation of the cover shell 34 itself can also be achieved by, for example, attaching a reinforcement plate to the upper surface of the cover shell 34.

For example, in the first embodiment explained above, the three lock claws 37*a* included in the lock pieces 37 functioning as the provisional holding mechanism of the present invention and the three lock holes 23 formed in the cage 21 are formed and the three sets of the lock claws 37*a* and the lock holes 23 are disposed on the front surface and the left and right side surfaces of the compression connector 31. However, in the present invention, the number and disposition positions of members functioning as the provisional holding mechanism can be optionally changed if the members can support the regular connection to be carried out later.

For example, in the first embodiment explained above, the one screw 38 and the one not-shown nut functioning as the regular connection mechanism of the present invention are installed. However, a plurality of screws may be installed. Installation positions of the screws can be disposed in any positions of the compression connector. That is, in the present invention, the number and disposition positions of members functioning as the regular connection mechanism can be optionally changed.

As explained above, the connector with substrate 10 according to the first embodiment is the connector with substrate 10 in which the compression connector 31 pressed against and connected to a connection target object and the substrate 11 are attached, the connector with substrate 10 including the provisional holding mechanism that provisionally holds the compression connector 31 on the substrate 11 and the regular connection mechanism that, after the compression connector 31 is provisionally held on the substrate 11 by the provisional holding mechanism, regularly connects the compression connector 31 to the substrate 11. Therefore, with the connector with substrate 10 according to the first embodiment, it is possible to realize a configuration for performing secure attachment while improving workability of attachment (fixing) of the compression connector 31 to the substrate 11.

The configuration of the connector with substrate 10 according to the first embodiment is explained above with reference to FIGS. 1 to 14. Subsequently, a connector with substrate 100 according to a second embodiment, which is another form example that the connector with substrate according to the present invention can take, is explained with reference to FIGS. 15 to 21. Note that, in the following explanation, members that are the same as or similar to the members explained in the first embodiment above are denoted by the same reference numerals and signs and explanation of the members is sometimes omitted.

Second Embodiment

The connector with substrate 100 according to the second embodiment includes, as shown in FIGS. 15 to 19, the substrate 11 and the compression connector 31 attached to the upper surface of the substrate 11.

The substrate 11 includes a not-shown printed circuit and the like. The substrate 11 is electrically connected to the compression connector 31 attached to the upper surface of the substrate 11 to be configured to be able to deliver an electric signal, power supply power, and the like.

Figure 17:
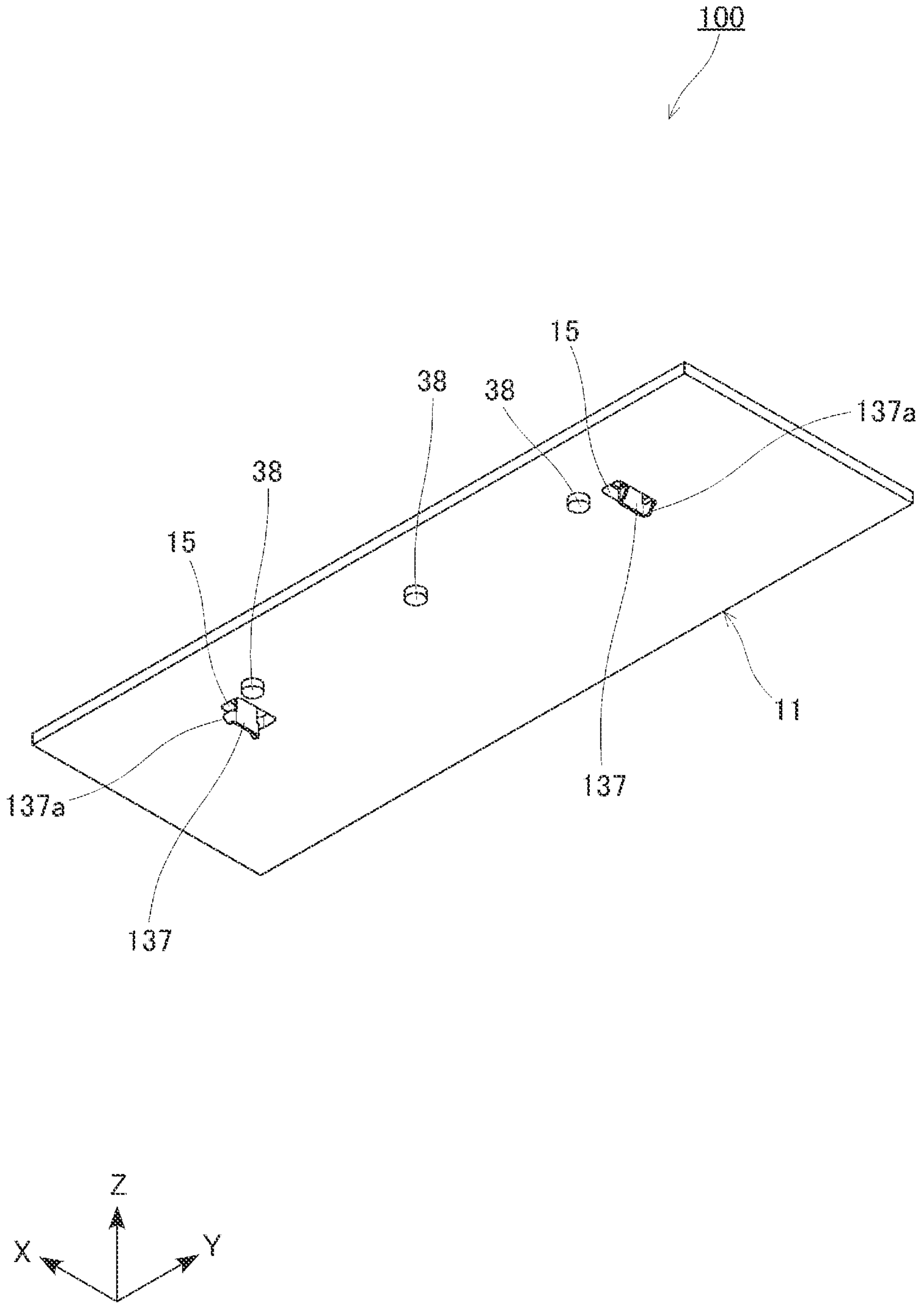
FIG. 17 is an exterior perspective view of the connector with substrate according to the second embodiment viewed from the front lower right.

As shown in, in particular, FIG. 17, a plurality of holding holes 15 are formed in the substrate 11. Two holding pieces 137 included in the compression connector 31 explained below are inserted into the plurality of (in the second embodiment, two) holding holes 15 to provisionally hold the compression connector 31 on the substrate 11.

The compression connector 31 includes, as shown in FIGS. 15 to 21, contacts 32 that are in contact with the substrate 11, a housing 33 to which the contacts 32 are fixed, a cover shell 34 that covers the upper surface portion of the housing 33, and a bottom shell 35 that covers the lower surface portion of the housing 33.

Figure 21:
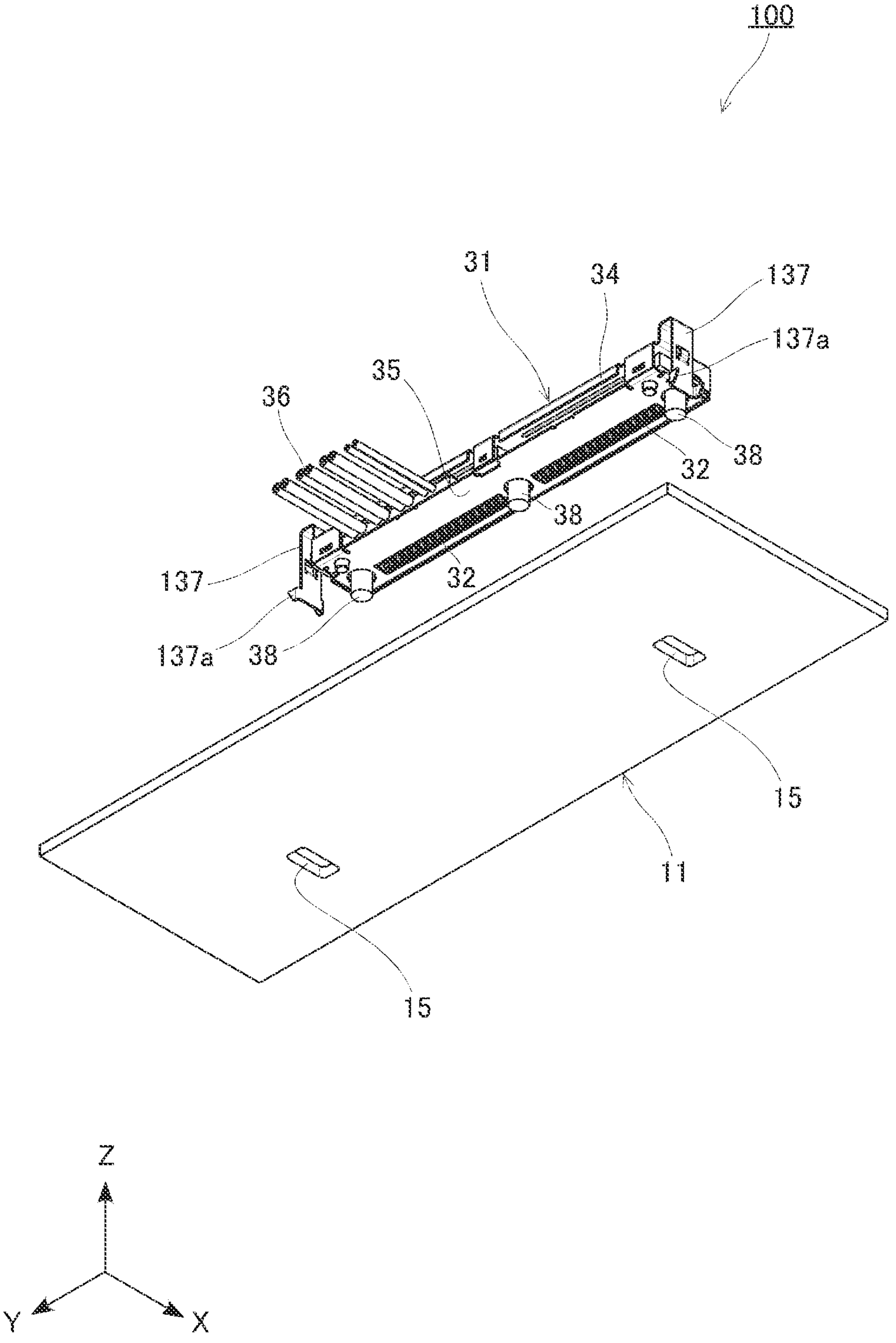
FIG. 21 is an exterior perspective view of the state in which the compression connector is detached from the substrate in the connector with substrate according to the second embodiment, the state being viewed from the rear lower left.

As shown in, in particular, FIG. 21, a plurality of contacts 32 are disposed to be laterally arranged in the left-right direction.

In the cover shell 34 in the second embodiment, as shown in FIGS. 15 to 21, two holding pieces 137 are installed. In the cover shell 34 in the second embodiment, of the two holding pieces 137, one holding piece 137 is disposed in a position closer to the right side rear of the cover shell 34 and one holding piece 137 is disposed in a position closer to the left side rear of the cover shell 34.

Figure 18:
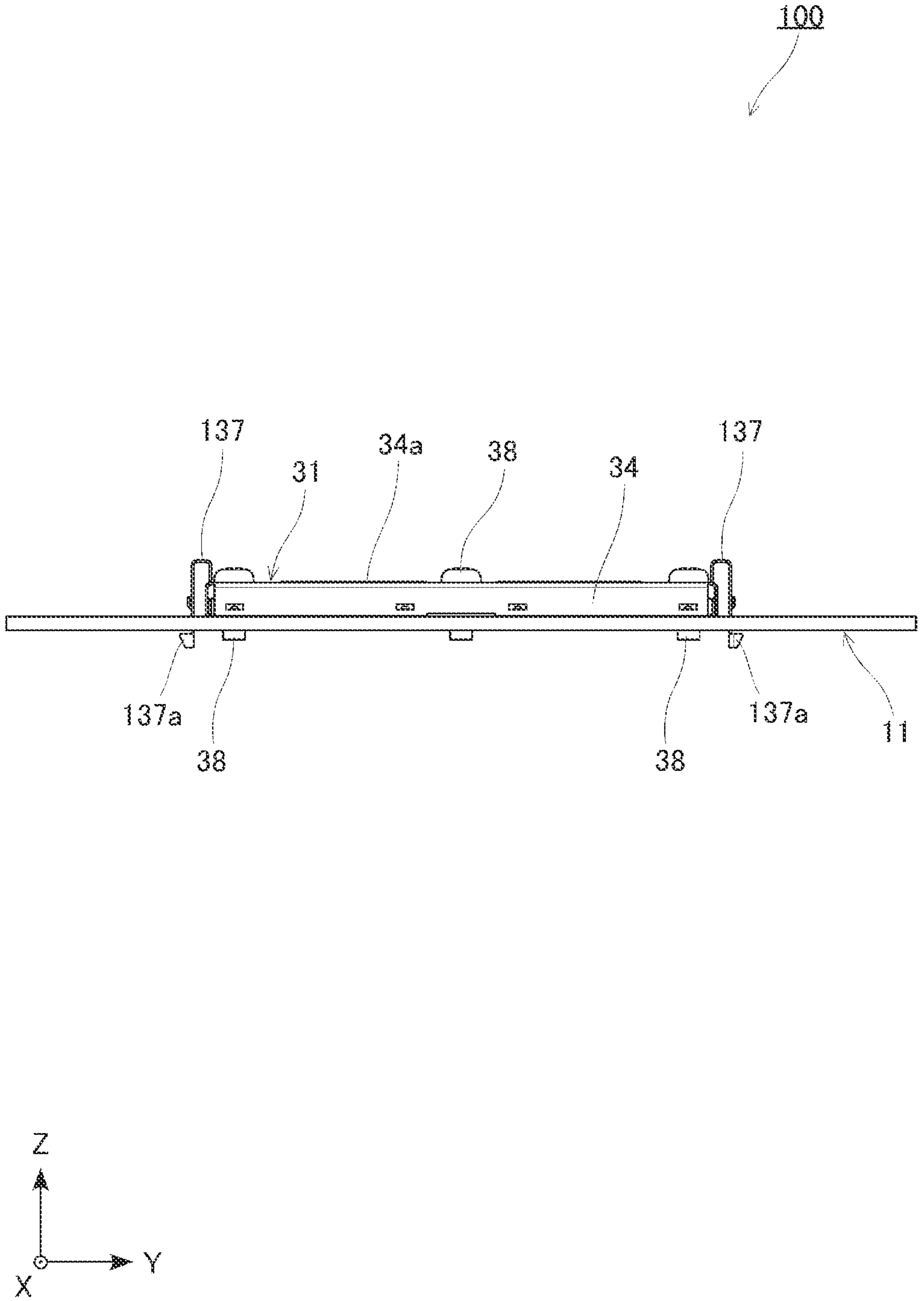
FIG. 18 is a front view of the connector with substrate according to the second embodiment.
Figure 19:
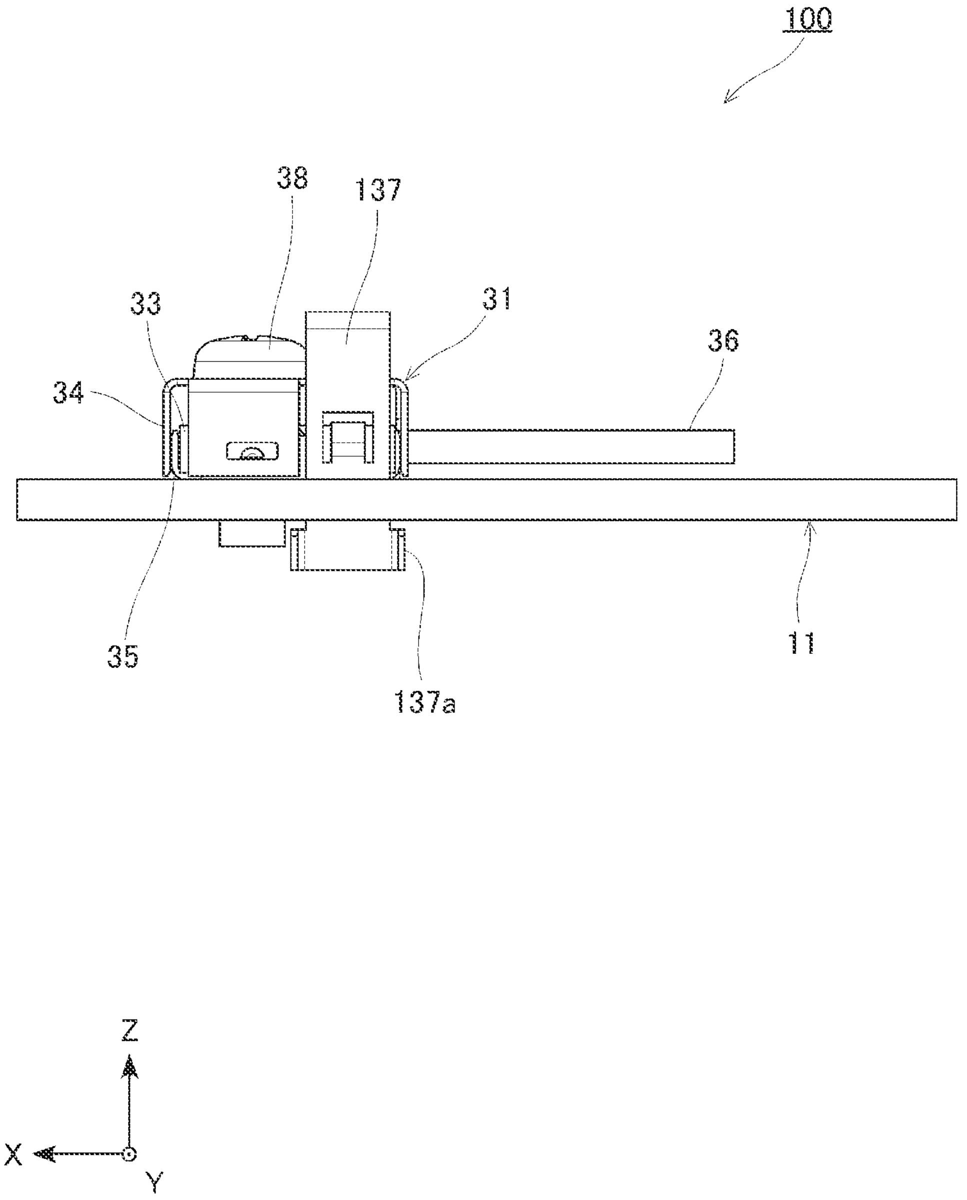
FIG. 19 is a right side view of the connector with substrate according to the second embodiment.
Figure 20:
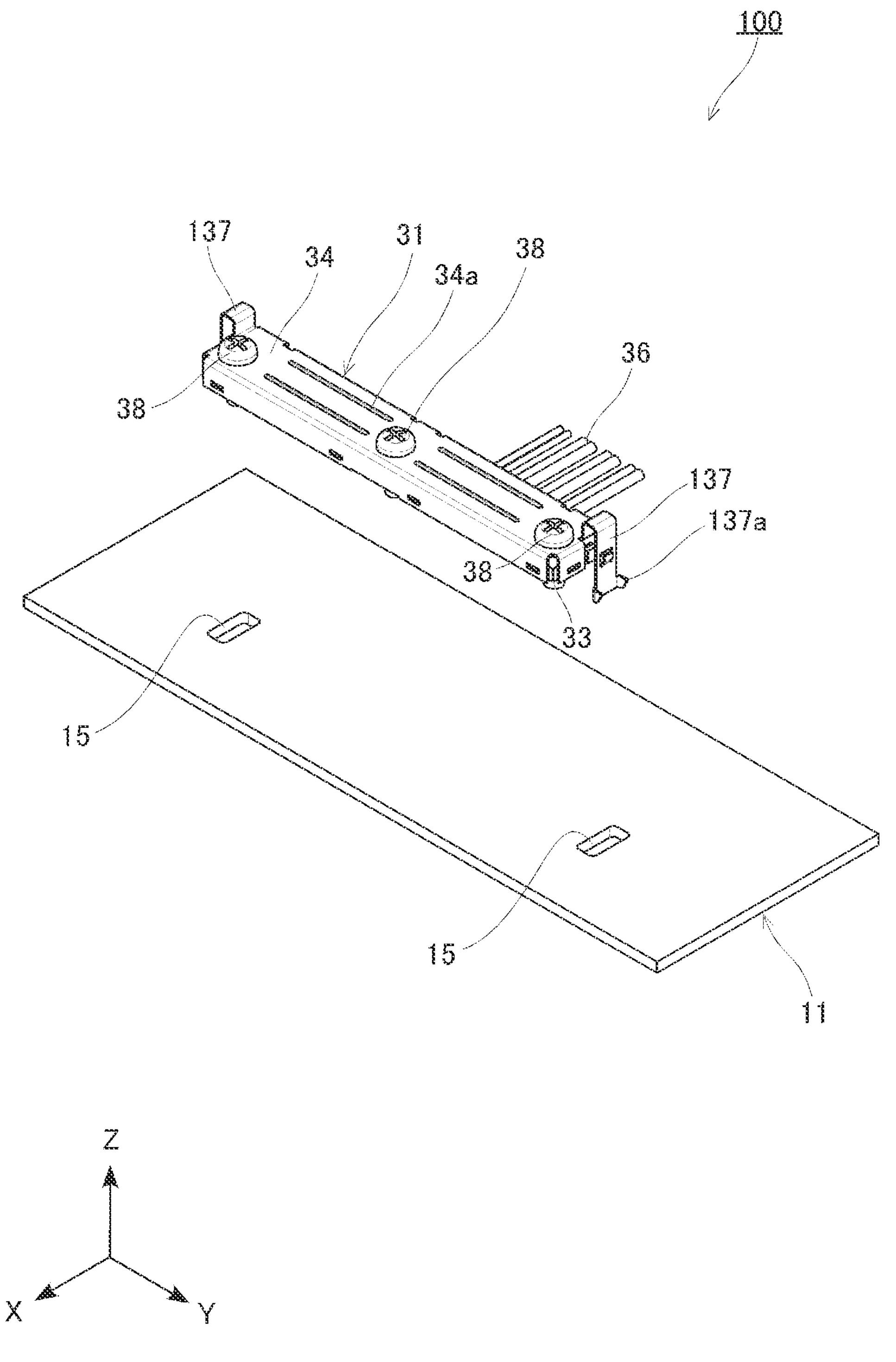
FIG. 20 is an exterior perspective view of a state in which a compression connector is detached from a substrate in the connector with substrate according to the second embodiment, the state being viewed from the front upper right.

The two holding pieces 137 have, as shown in, in particular, FIGS. 18, 20, and 21, a shape formed by the holding pieces 137 projecting from the top surfaces on the left and right side surface sides of the cover shell 34 in the vertical direction on the opposite side of the substrate 11, that is, the upward direction and, then, being bent in a reverse U shape in a front view and the distal ends of the holding pieces 137 extending to the substrate 11 side. Holding claws 137*a* are formed at the distal ends. The holding claws 137*a* have a slope shape narrowing downward and are formed in a wedge shape widening toward the upper side. That is, the holding claws 137*a* are formed, upward from the bottom positions, to gradually project outward from the surfaces of the holding pieces 137. The two holding claws 137*a* are disposed in positions corresponding to the formation positions of the two holding holes 15 formed in the substrate 11 explained above. Therefore, when the compression connector 31 is moved in the −Z direction toward the upper surface of the substrate 11 and pressed against the upper surface, the holding claws 137*a* gradually enter the holding holes 15, with the holding pieces 137 being pushed to the cover shell 34 side, with force by spring elasticity by the shape bent in the substantially reverse U shape of the holding pieces 137 and action by the shape of the slopes on the lower sides of the holding claws 137*a*. Finally, an outward pressing force by the spring elasticity exerted by the holding pieces 137 acts and the holding claws 137*a* are completely fit in the holding holes 15 (see a state shown in FIGS. 15 to 19). At this time, the holding claws 137*a* are caught in the holding holes 15 formed in the substrate 11 by action of the wedge shape of the holding claws 137*a* to receive contact reaction in the vertical direction applied to the substrate 11 by the plurality of contacts 32. This state is a state in which the compression connector 31 is provisionally held on the substrate 11. That is, the holding claws 137*a* respectively included in the two holding pieces 137 and the two holding holes 15 formed in the substrate 11 configure the provisional holding mechanism of the present invention.

In the connector with substrate 100 according to the second embodiment, as explained above, after the state in which the compression connector 31 is provisionally held on the substrate 11 is realized, the regular connection of the compression connector 31 to the substrate 11 is executed using the three screws 38 included in the compression connector 31. Specifically, screw heads of the three screws 38 are disposed on the upper surface side of the cover shell 34 configuring the compression connector 31 and screw distal end portions are pierced through to the bottom surface side of the substrate 11. Therefore, by fastening not-shown nuts to the screw distal end portions pierced through to the bottom surface side of the substrate 11, it is possible to regularly connect the compression connector 31 to the substrate 11. That is, screwing performed using the three screws 38 and the not-shown nuts functions as the regular connection mechanism of the present invention.

Note that, in the second embodiment, force in connection is applied to the cover shell 34 in both of the state in which the compression connector 31 is provisionally held on the substrate 11 and the state in which the compression connector 31 is regularly connected to the substrate 11. Since the cover shell 34 is formed by a thin metal plate having a shape long in the left-right direction, the cover shell 34 preferably has structure for preventing deformation of the cover shell 34 itself when receiving force for connection and fixing. Therefore, in the cover shell 34 according to the second embodiment, the plurality of lines of projections 34*a* extending in the left-right direction are formed on the upper surface. Strengthening against deformation of the cover shell 34 itself can be achieved by formation action of the plurality of lines of projections 34*a*.

A preferred embodiment of the present invention is explained above. However, the technical scope of the present invention is not limited to the scope described in the second embodiment. Various changes or improvements can be added to the second embodiment.

For example, in the second embodiment explained above, the strengthening against deformation of the cover shell 34 itself is achieved by forming the plurality of lines of projections 34*a* extending in the left-right direction on the upper surface of the cover shell 34. However, in the present invention, means other than forming the projections 34*a* may be adopted if the means is configured to have the same action effects. The strengthening against deformation of the cover shell 34 itself can also be achieved by, for example, attaching a reinforcement plate to the upper surface of the cover shell 34.

For example, in the second embodiment explained above, the two holding claws 137*a* included in the holding pieces 137 and the two holding holes 15 formed in the substrate 11 functioning as the provisional holding mechanism of the present invention are formed and the two sets of the holding claws 137*a* and the holding holes 15 are disposed on the left and right side surfaces of the compression connector 31. However, in the present invention, the number and disposition positions of members functioning as the provisional holding mechanism can be optionally changed if the members can support the regular connection to be carried out later.

For example, in the second embodiment explained above, the three screws 38 and the three not-shown nuts functioning as the regular connection mechanism of the present invention are formed. However, one or more screws only have to be present. Installation positions of the screws can also be disposed in any positions of the compression connector. That is, in the present invention, the number and disposition positions of members functioning as the regular connection mechanism can be optionally changed.

As explained above, the connector with substrate 100 according to the second embodiment is the connector with substrate 100 in which the compression connector 31 pressed against and connected to a connection target object and the substrate 11 are attached, the connector with substrate 100 including the provisional holding mechanism that provisionally holds the compression connector 31 on the substrate 11 and the regular connection mechanism that, after the compression connector 31 is provisionally held on the substrate 11 by the provisional holding mechanism, regularly connects the compression connector 31 to the substrate 11. Therefore, with the connector with substrate 100 according to the second embodiment, it is possible to realize a configuration for performing secure attachment while improving workability of attachment (fixing) of the compression connector 31 to the substrate 11.

The configuration of the connector with substrate 100 according to the second embodiment is explained above with reference to FIGS. 15 to 21. Subsequently, a connector with substrate 200 according to a third embodiment, which is another form example that the connector with substrate according to the present invention can take, is explained with reference to FIGS. 22 to 25. Note that, in the following explanation, members that are the same as or similar to the members explained in the first and second embodiments above are denoted by the same reference numerals and signs and explanation of the members is sometimes omitted.

Third Embodiment

The connector with substrate 200 according to the third embodiment indicates a modified form example of the holding pieces 137 and the holding claws 137*a* functioning as the provisional holding mechanism in the connector with substrate 100 according to the second embodiment explained above. In the second embodiment explained above, the holding pieces 137 project from the cover shell 34 while having the U shape (the substantially reverse U shape) and the holding claws 137*a* are formed at the distal ends on the projection sides of the U shape (the substantially reverse U shape). However, a shape that can be adopted in the holding piece of the present invention is not limited to the U shape (the substantially reverse U shape) and can be, for example, an L shape. Such an implementation form example is shown in FIGS. 22 to 25.

Figure 22:
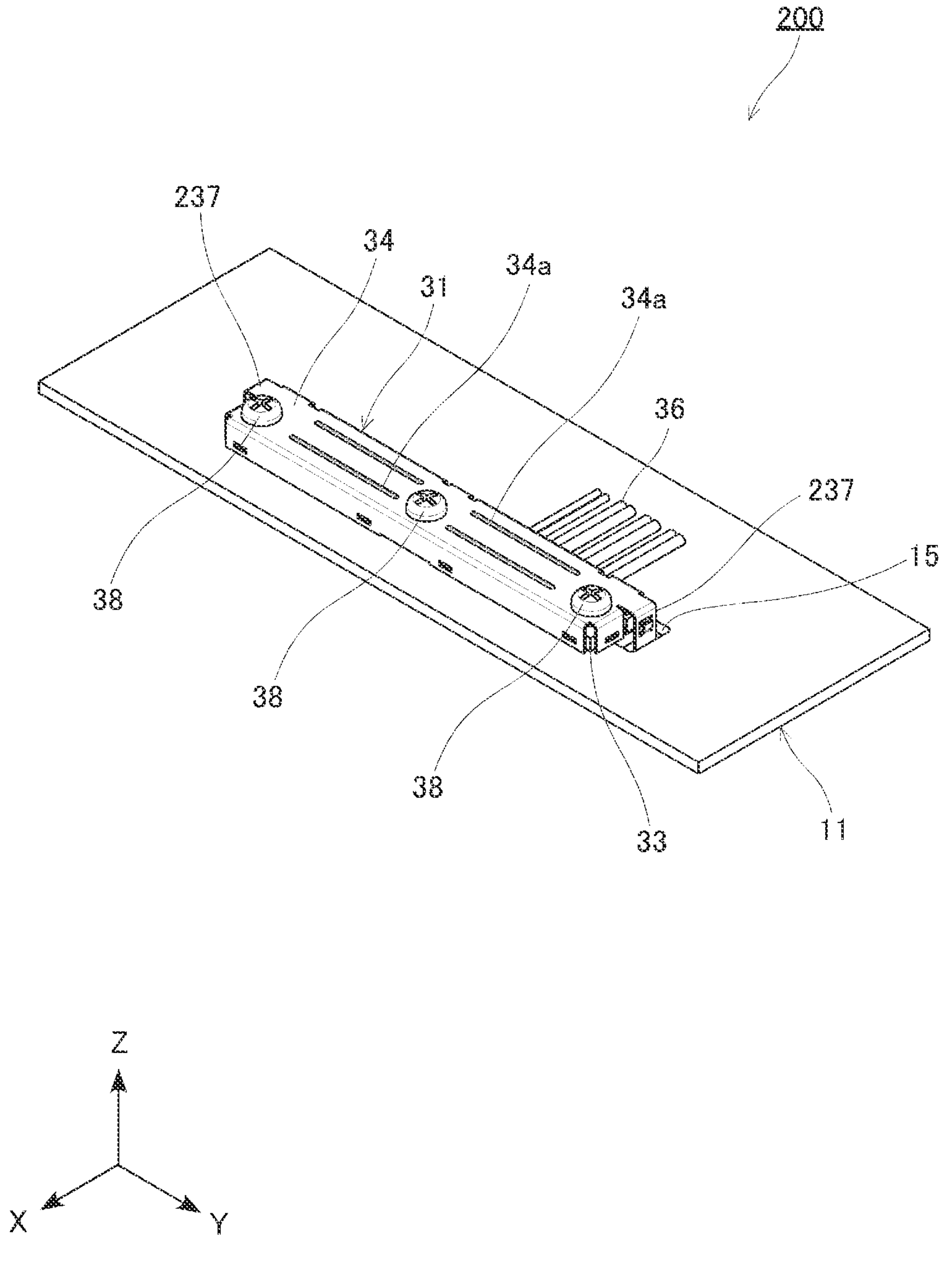
FIG. 22 is an exterior perspective view of a connector with substrate according to a third embodiment viewed from the front upper right.
Figure 23:
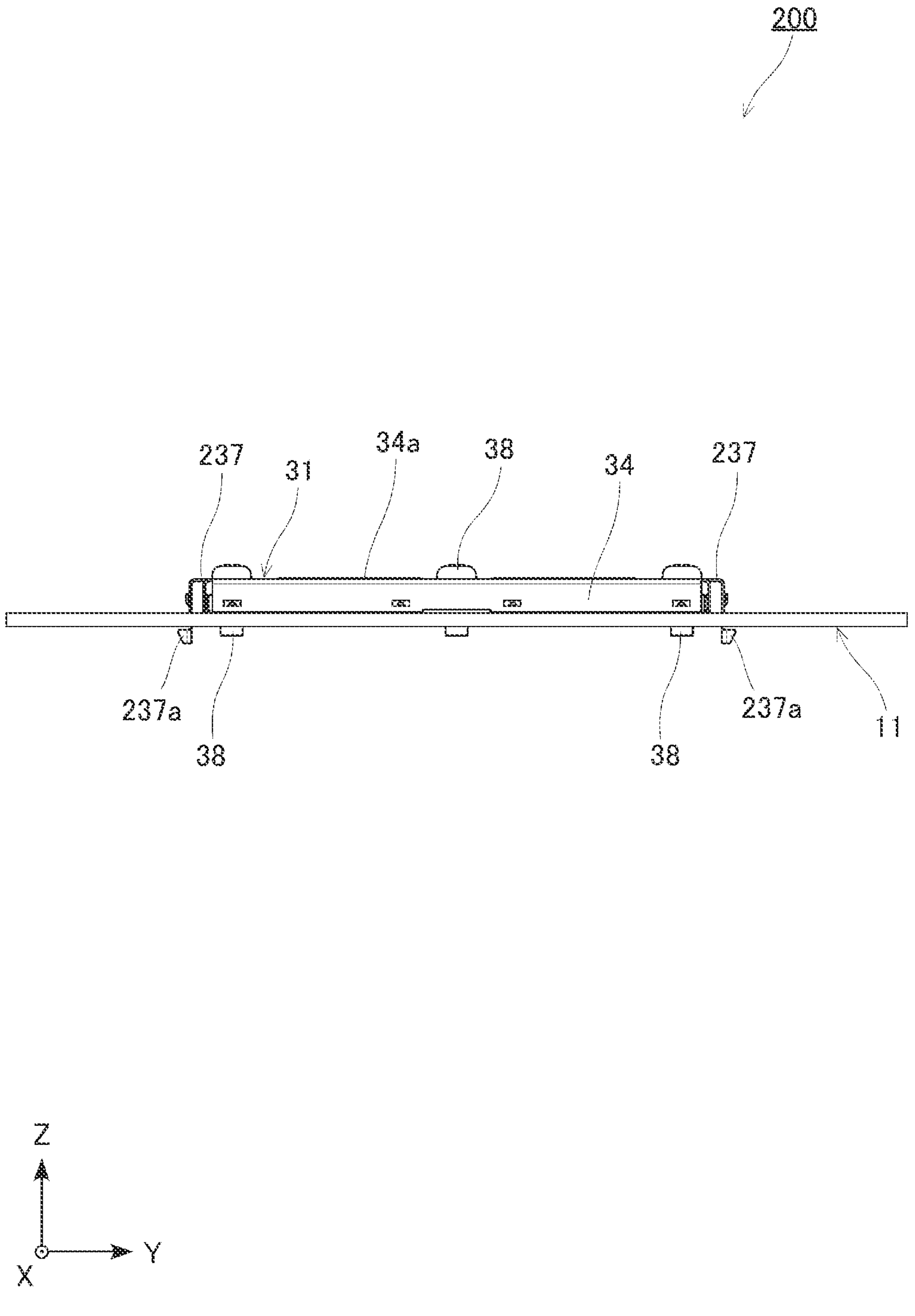
FIG. 23 is a front view of the connector with substrate according to the third embodiment.
Figure 24:
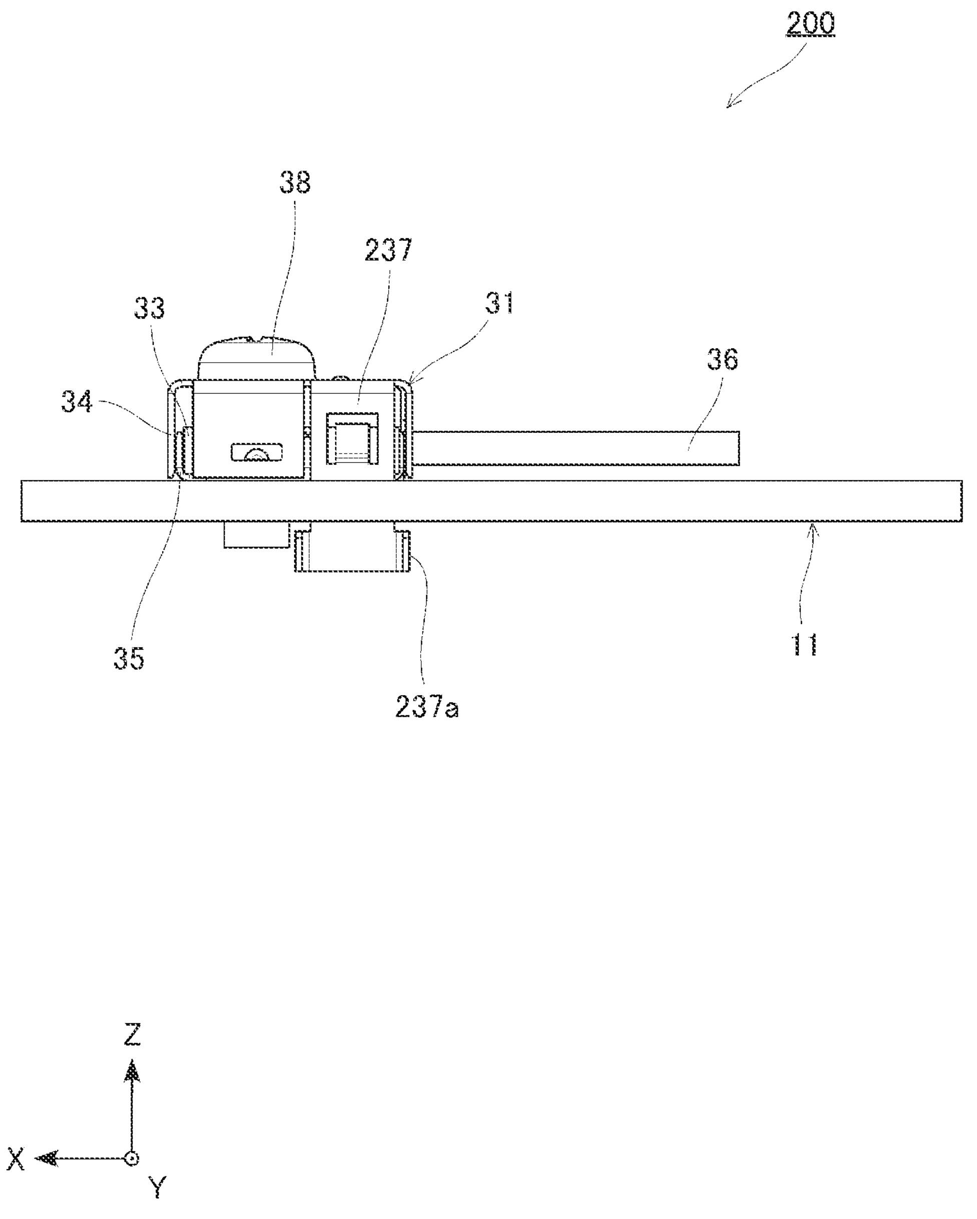
FIG. 24 is a right side view of the connector with substrate according to the third embodiment.

The connector with substrate 200 according to the third embodiment includes, as shown in FIGS. 22 to 24, the substrate 11 and the compression connector 31 attached to the upper surface of the substrate 11.

The substrate 11 includes a not-shown printed circuit and the like. The substrate 11 is electrically connected to the compression connector 31 attached to the upper surface of the substrate 11 to be configured to be able to deliver an electric signal, power supply power, and the like.

Figure 25:
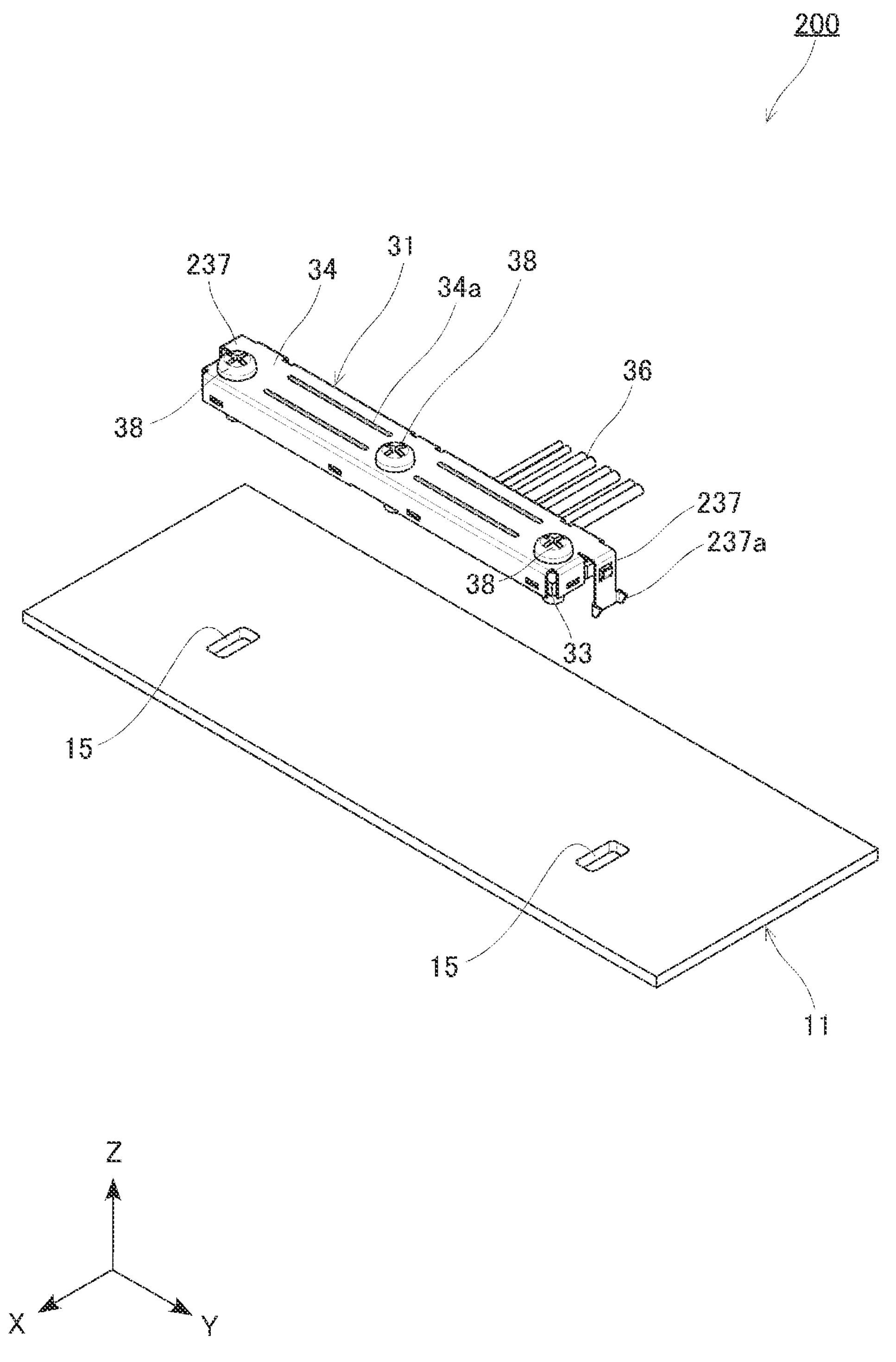
FIG. 25 is an exterior perspective view of a state in which a compression connector is detached from a substrate in the connector with substrate according to the third embodiment, the state being viewed from the front upper right.

As shown in, in particular, FIG. 25, the plurality of holding holes 15 are formed in the substrate 11. Two holding pieces 237 included in the compression connector 31 explained below are inserted into the plurality of (in the third embodiment, two) holding holes 15 to provisionally hold the compression connector 31 on the substrate 11.

As in the second embodiment explained above, the compression connector 31 includes the contacts 32 that are in contact with the substrate 11, the housing 33 to which the contacts 32 are fixed, the cover shell 34 that covers the upper surface portion of the housing 33, and the bottom shell 35 that covers the lower surface portion of the housing 33. The plurality of contacts 32 are disposed to be laterally arranged in the left-right direction.

On the cover shell 34 in the third embodiment, as shown in FIGS. 22 to 25, the two holding pieces 237 are installed. In the cover shell 34 in the third embodiment, of the two holding pieces 237, one holding piece 237 is disposed in a position closer to the right side rear of the cover shell 34 and one holding piece 237 is disposed in a position closer to the left side rear of the cover shell 34.

The two holding pieces 237 have, as shown in, in particular, FIGS. 23 and 25, a shape formed by the holding pieces 237 projecting from the top surfaces on the left and right side surface sides of the cover shell 34 in a direction parallel to the substrate 11, that is, the left-right outward directions and, then, being bent in an L shape and the distal ends of the holding pieces 237 extending to the substrate 11 side (that is, a substantially inverse L shape in a front view). Holding claws 237*a* are formed at the distal ends. The holding claws 237*a* have a slope shape narrowing downward and are formed in a wedge shape widening toward the upper side. That is, the holding claws 237*a* are formed, upward from the bottom positions, to gradually project outward from the surfaces of the holding pieces 237. The two holding claws 237*a* are disposed in positions corresponding to the formation positions of the two holding holes 15 formed in the substrate 11 explained above. Therefore, when the compression connector 31 is moved in the −Z direction toward the upper surface of the substrate 11 and pressed against the upper surface, the holding claws 237*a* gradually enter the holding holes 15, with the holding pieces 237 being pushed to the cover shell 34 side, with force by spring elasticity by the shape bent in the substantially inverse L shape of the holding pieces 237 and action by the shape of the slopes on the lower sides of the holding claws 237*a*. Finally, an outward pressing force by the spring elasticity exerted by the holding pieces 237 acts and the holding claws 237*a* are completely fit in the holding holes 15 (see a state shown in FIGS. 23 and 24). At this time, the holding claws 237*a* are caught in the holding holes 15 formed in the substrate 11 by action of the wedge shape of the holding claws 237*a* to receive contact reaction in the vertical direction applied to the substrate 11 by the plurality of contacts 32. This state is a state in which the compression connector 31 is provisionally held on the substrate 11. That is, the holding claws 237*a* respectively included in the two holding pieces 237 and the two holding holes 15 formed in the substrate 11 configure the provisional holding mechanism of the present invention.

In the connector with substrate 200 according to the third embodiment, as explained above, after the state in which the compression connector 31 is provisionally held on the substrate 11 is realized, the regular connection of the compression connector 31 to the substrate 11 is executed using the three screws 38 included in the compression connector 31. Specifically, screw heads of the three screws 38 are disposed on the upper surface side of the cover shell 34 configuring the compression connector 31 and screw distal end portions are pierced through to the bottom surface side of the substrate 11. Therefore, by fastening not-shown nuts to the screw distal end portions pierced through to the bottom surface side of the substrate 11, it is possible to regularly connect the compression connector 31 to the substrate 11. That is, screwing performed using the three screws 38 and the not-shown nuts functions as the regular connection mechanism of the present invention.

Note that, in the third embodiment, force in connection is applied to the cover shell 34 in both of the state in which the compression connector 31 is provisionally held on the substrate 11 and the state in which the compression connector 31 is regularly connected to the substrate 11. Since the cover shell 34 is formed by a thin metal plate having a shape long in the left-right direction, the cover shell 34 preferably has structure for preventing deformation of the cover shell 34 itself when receiving force for connection and fixing. Therefore, in the cover shell 34 according to the third embodiment, the plurality of lines of projections 34*a* extending in the left-right direction are formed on the upper surface. Strengthening against deformation of the cover shell 34 itself can be achieved by formation action of the plurality of lines of projections 34*a*.

The configuration of the connector with substrate 200 according to the third embodiment is explained above with reference to FIGS. 22 to 25. Subsequently, a connector with substrate 300 according to a fourth embodiment, which is still another form example that the connector with substrate according to the present invention can take, is explained with reference to FIGS. 26 to 30. Note that, in the following explanation, members that are the same as or similar to the members explained in the first to third embodiments above are denoted by the same reference numerals and signs and explanation of the members is sometimes omitted.

Fourth Embodiment

The connector with substrate 300 according to the fourth embodiment indicates a modified form example of the holding claws 237*a* included in the holding pieces 237 functioning as the provisional holding mechanism in the connector with substrate 200 according to the third embodiment explained above. In the third embodiment explained above, the holding claws 237*a* are formed in the wedge shape. However, a shape that can be adopted in the provisional holding mechanism of the present invention is not limited to the wedge shape of the holding claws 237*a* and can be, for example, a curved shape. Such an implementation form example is shown in FIGS. 26 to 30.

Figure 26:
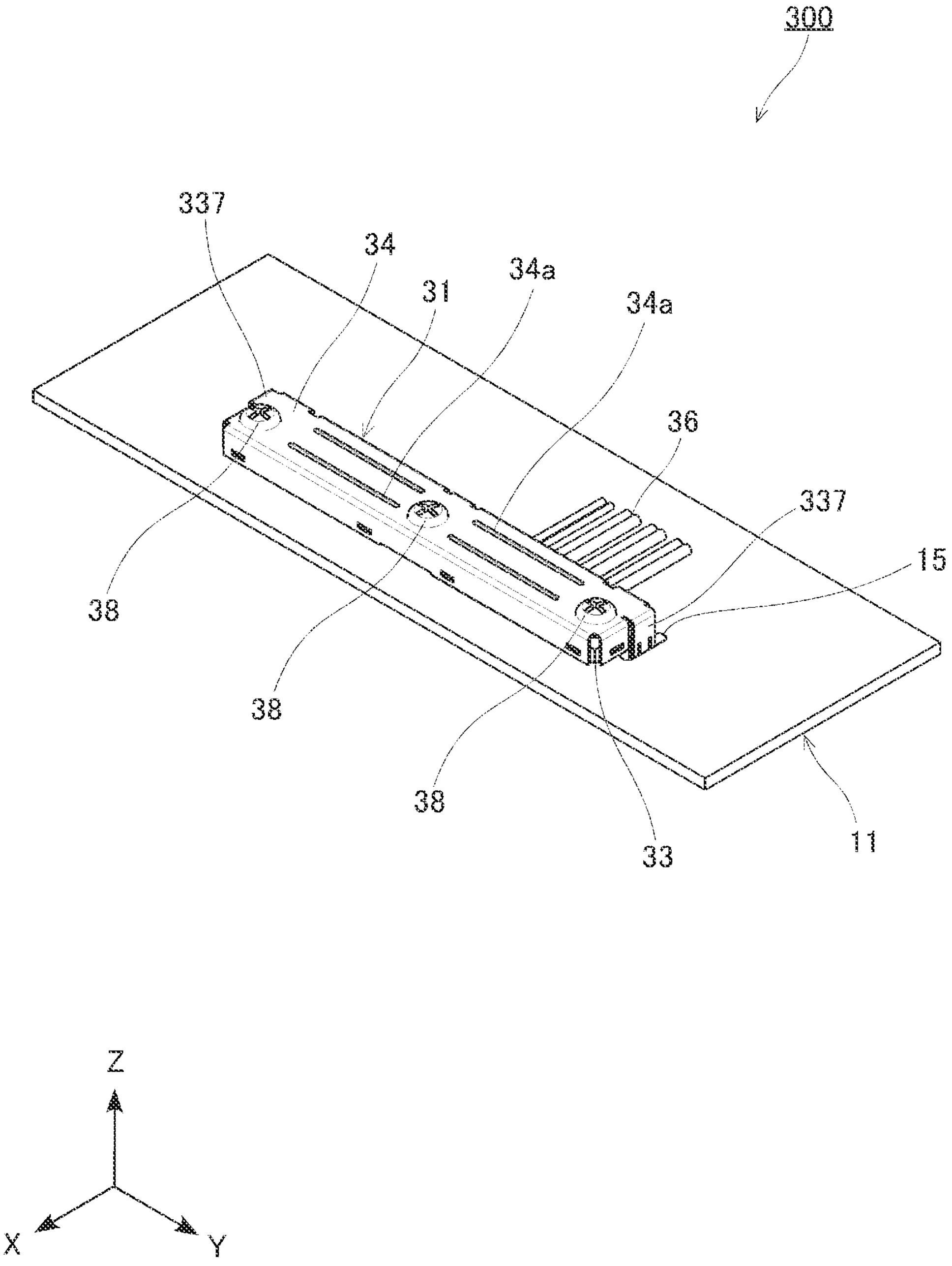
FIG. 26 is an exterior perspective view of a connector with substrate according to a fourth embodiment viewed from the front upper right.
Figure 27:
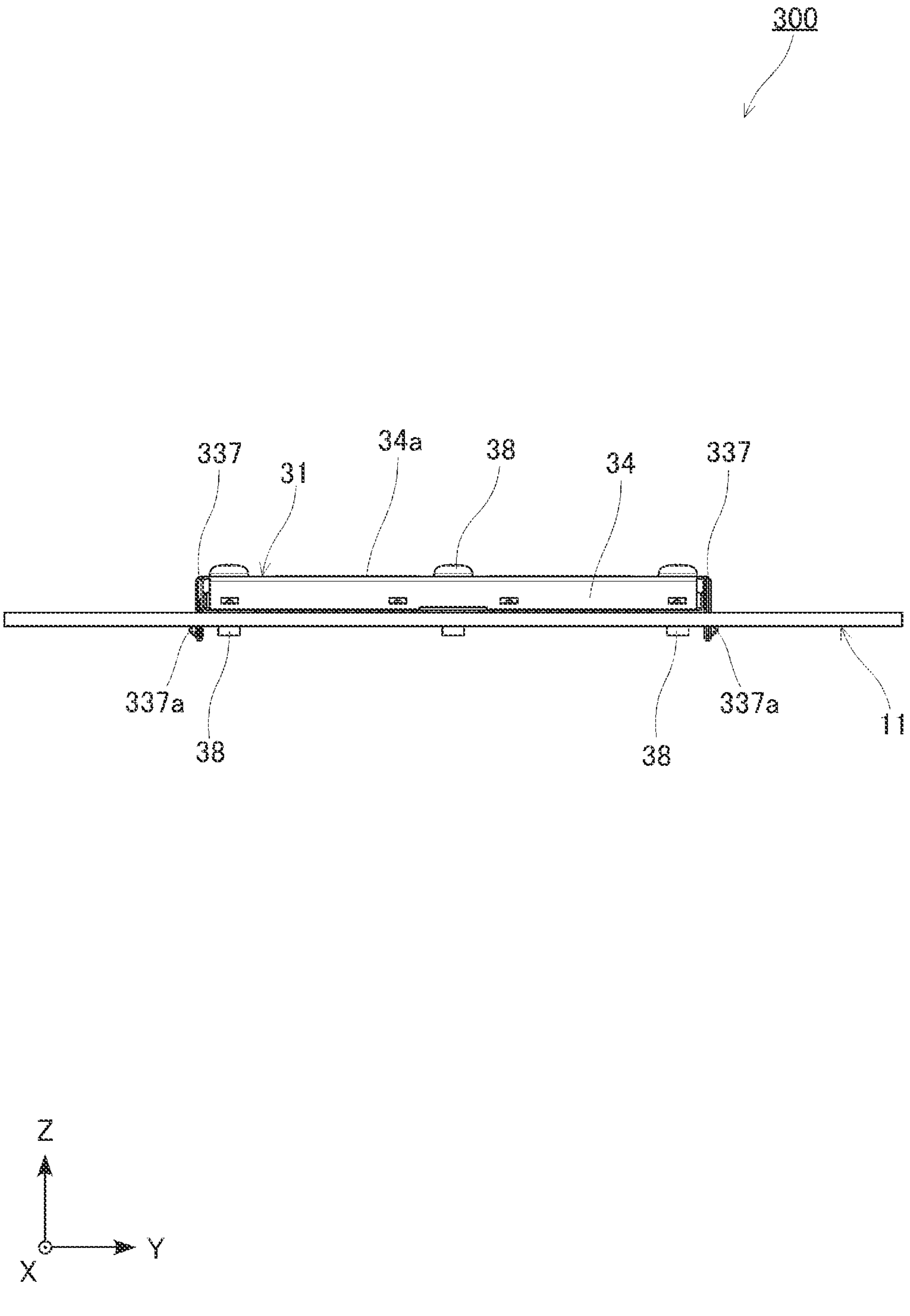
FIG. 27 is a front view of the connector with substrate according to the fourth embodiment.
Figure 28:
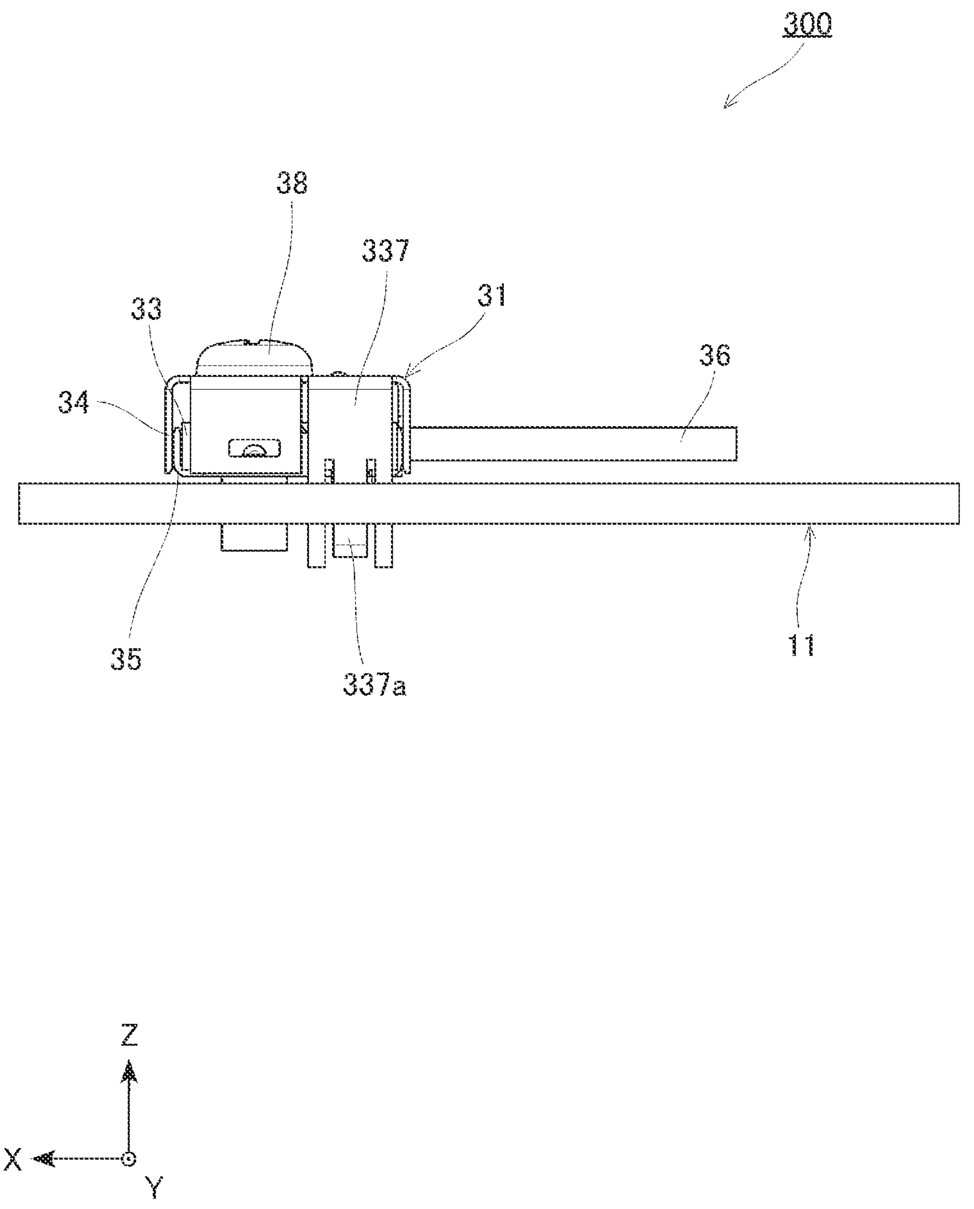
FIG. 28 is a right side view of the connector with substrate according to the fourth embodiment.

The connector with substrate 300 according to the fourth embodiment includes, as shown in FIGS. 26 to 28, the substrate 11 and the compression connector 31 attached to the upper surface of the substrate 11.

The substrate 11 includes a not-shown printed circuit and the like. The substrate 11 is electrically connected to the compression connector 31 attached to the upper surface of the substrate 11 to be configured to be able to deliver an electric signal, power supply power, and the like.

Figure 29:
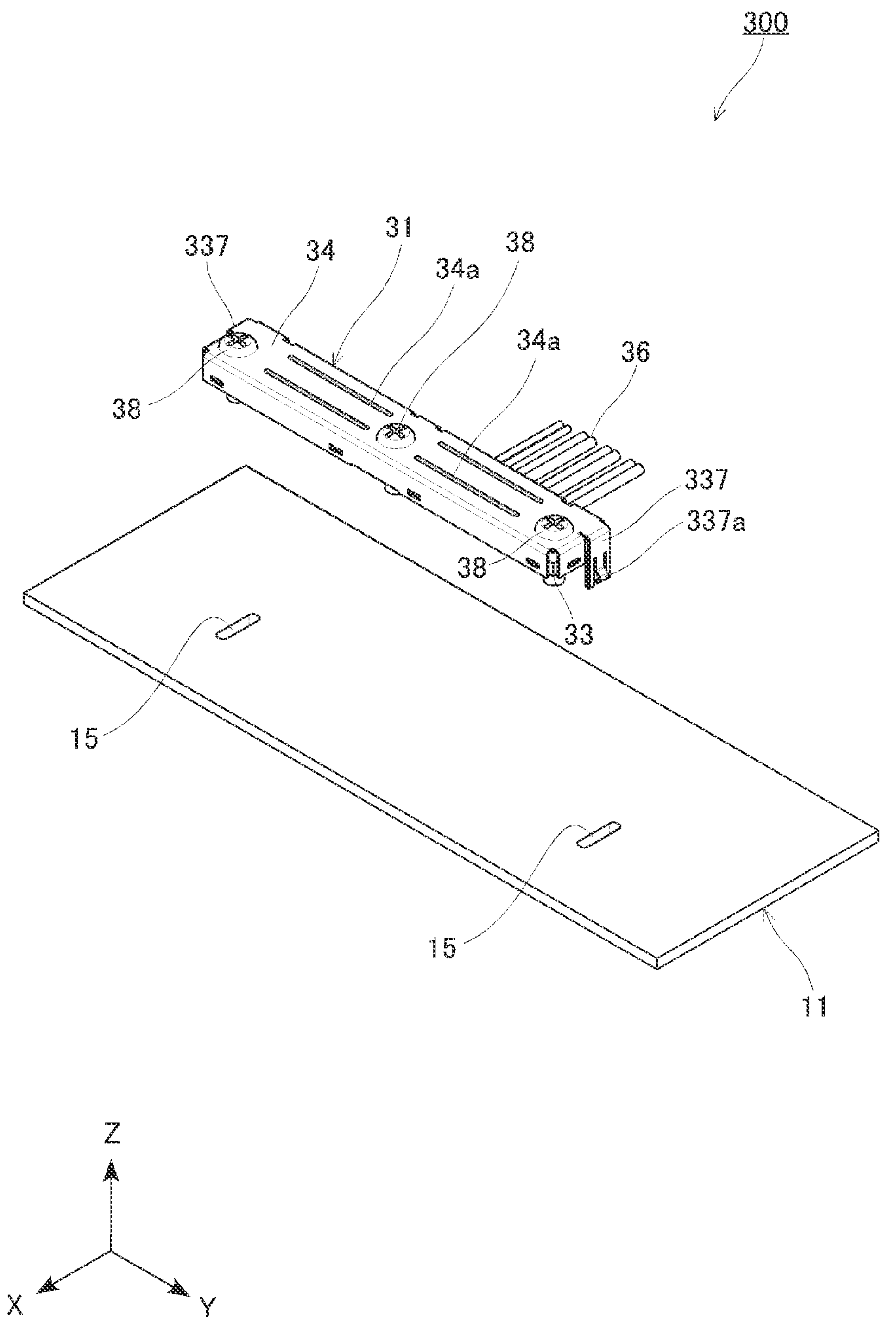
FIG. 29 is an exterior perspective view of a state in which a compression connector is detached from a substrate in the connector with substrate according to the fourth embodiment, the state being viewed from the front upper right.
Figure 30:
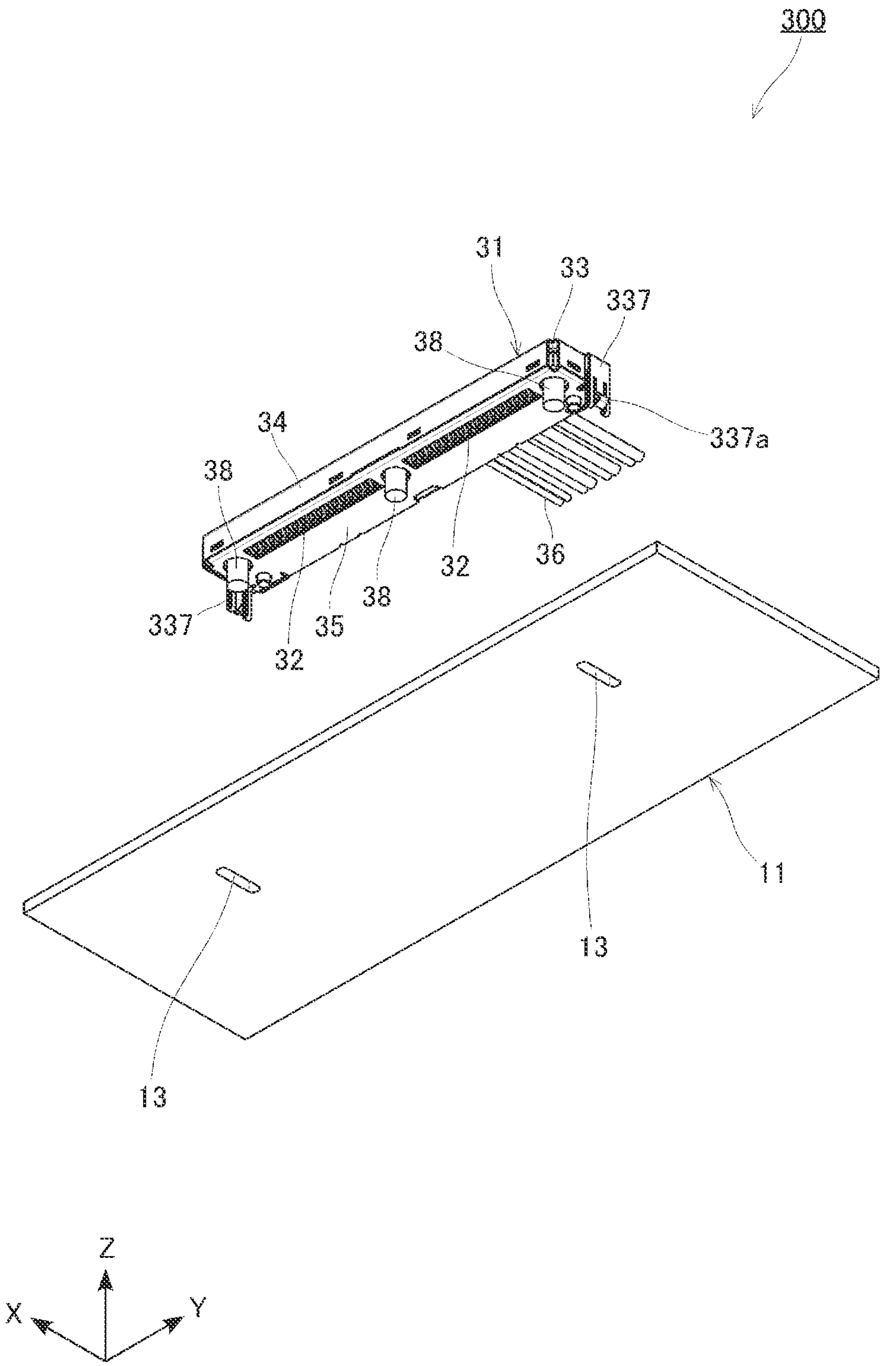
FIG. 30 is an exterior perspective view of the state in which the compression connector is detached from the substrate in the connector with substrate according to the fourth embodiment, the state being viewed from the front lower right.
Figure 31:
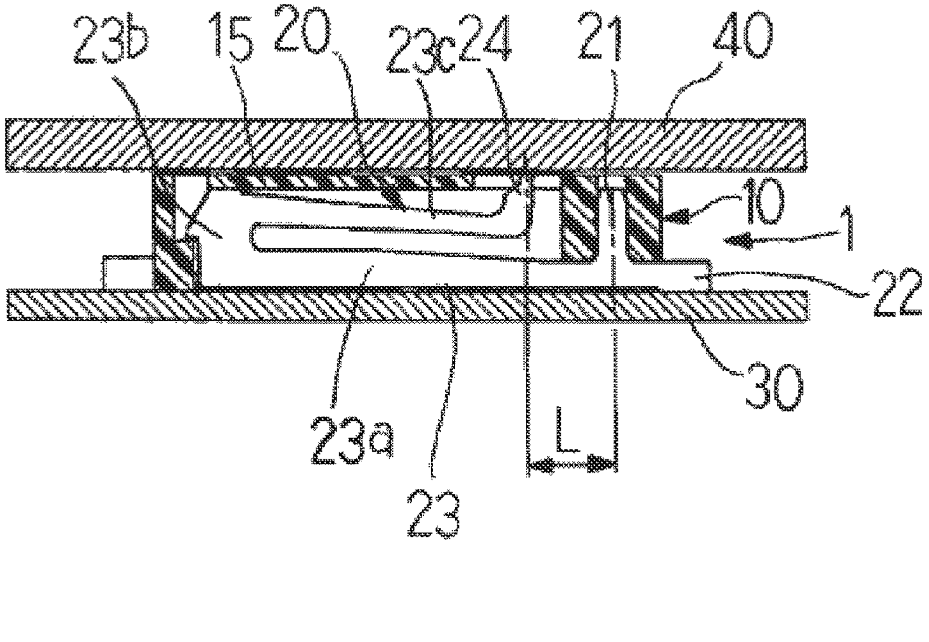
FIG. 31 is a sectional view showing a state in which a connector of a compression type of the related art is disposed between circuit boards.

As shown in, in particular, FIGS. 29 and 30, the plurality of holding holes 15 are formed in the substrate 11. Two holding pieces 337 included in the compression connector 31 explained below are inserted into the plurality of (in the fourth embodiment, two) holding holes 15 to provisionally hold the compression connector 31 on the substrate 11.

As in the first to third embodiments explained above, the compression connector 31 includes the contacts 32 that are in contact with the substrate 11, the housing 33 to which the contacts 32 are fixed, the cover shell 34 that covers the upper surface portion of the housing 33, and the bottom shell 35 that covers the lower surface portion of the housing 33. The plurality of contacts 32 are disposed to be laterally arranged in the left-right direction.

On the cover shell 34 in the fourth embodiment, as shown in FIGS. 26 to 30, the two holding pieces 337 are installed. In the cover shell 34 in the fourth embodiment, of the two holding pieces 337, one holding piece 337 is disposed in a position closer to the right side rear of the cover shell 34 and one holding piece 337 is disposed in a position closer to the left side rear of the cover shell 34.

The two holding pieces 337 have, as shown in, in particular, FIGS. 26, 27, and 29, a shape formed by the holding pieces 337 projecting from the top surfaces on the left and right side surface sides of the cover shell 34 in a direction parallel to the substrate 11, that is, the left-right outward directions and, then, being bent in an L shape and the distal ends of the holding pieces 337 extending to the substrate 11 side. Curved shape portions 337*a* are formed at the distal ends. The curved shape portions 337*a* are parts formed by cutting two notches in the longitudinal direction at the distal ends of the holding pieces 337 bent in an L shape and having a substantially inverse L shape in a front view and curving a plate member located in the center of the two notches in the longitudinal direction to project to the left-right outward directions. That is, the curved shape portions 337*a* are formed to, upward from the bottom position, gradually project outward from the surfaces of the holding pieces 337 and thereafter gradually retract. The two curved shape portions 337*a* are disposed in positions corresponding to the formation positions of the two holding holes 15 formed in the substrate 11 explained above. Therefore, when the compression connector 31 is moved in the −Z direction toward the upper surface of the substrate 11 and pressed against the upper surface, the curved shape portions 337*a* gradually enter the holding holes 15, with the holding pieces 337 being pushed to the cover shell 34 side, with force by spring elasticity by the shape bent in the substantially inverse L shape in the front view of the holding pieces 337 and action by the shape of the curved shape portions 337*a*. An outward pressing force by the spring elasticity exerted by the holding pieces 337 acts at a stage when the holding pieces 337 climb over the curved shapes of the curved shape portions 337*a* and the curved shape portions 337*a* are completely fit in the holding holes 15 (see a state shown in FIGS. 27 and 28). At this time, the curved shapes of the curved shape portions 337*a* pass through the holding holes 15 and are located on the lower surface side of the substrate 11. Therefore, the curved shape portions 337*a* are caught in the holding holes 15 formed in the substrate 11 to receive contact reaction in the vertical direction applied to the substrate 11 by the plurality of contacts 32. This state is a state in which the compression connector 31 is provisionally held on the substrate 11. That is, the curved shape portions 337*a* respectively included in the two holding pieces 337 and the two holding holes 15 formed in the substrate 11 configure the provisional holding mechanism of the present invention.

In the connector with substrate 300 according to the fourth embodiment, as explained above, after the state in which the compression connector 31 is provisionally held on the substrate 11 is realized, the regular connection of the compression connector 31 to the substrate 11 is executed using the three screws 38 included in the compression connector 31. Specifically, screw heads of the three screws 38 are disposed on the upper surface side of the cover shell 34 configuring the compression connector 31 and screw distal end portions are pierced through to the bottom surface side of the substrate 11. Therefore, by fastening not-shown nuts to the screw distal end portions pierced through to the bottom surface side of the substrate 11, it is possible to regularly connect the compression connector 31 to the substrate 11. That is, screwing performed using the three screws 38 and the not-shown nuts functions as the regular connection mechanism of the present invention.

Note that, in the fourth embodiment, force in connection is applied to the cover shell 34 in both of the state in which the compression connector 31 is provisionally held on the substrate 11 and the state in which the compression connector 31 is regularly connected to the substrate 11. Since the cover shell 34 is formed by a thin metal plate having a shape long in the left-right direction, the cover shell 34 preferably has structure for preventing deformation of the cover shell 34 itself when receiving force for connection and fixing.

Therefore, in the cover shell 34 according to the fourth embodiment, the plurality of lines of projections 34*a* extending in the left-right direction are formed on the upper surface. Strengthening against deformation of the cover shell 34 itself can be achieved by formation action of the plurality of lines of projections 34*a*.

A preferred embodiment of the present invention is explained above. However, the technical scope of the present invention is not limited to the scope described in the embodiment. Various changes or improvements can be added to the embodiment. It is evident from the description of the claims that such changed or improved forms can also be included in the technical scope of the present invention.

REFERENCE SIGNS LIST

10 Connector with substrate (in first embodiment)
100 Connector with substrate (in second embodiment)
200 Connector with substrate (in third embodiment)
300 Connector with substrate (in fourth embodiment)
11 Substrate
12 Attachment hole
13 Opening section
15 Holding hole (Provisional holding mechanism)
21 Cage
22 Leg section
23 Lock hole (Provisional holding mechanism)
31 Compression connector
32 Contact
32*a* Front end portion
32*b* Rear end portion
33 Housing
34 Cover shell
34*a* Projection
35 Bottom shell
36 Electric cable
37 Lock piece
37*a* Lock claw (Provisional holding mechanism)
38 Screw (Regular connection mechanism)
137 Holding piece
137*a* Holding claw (Provisional holding mechanism)
237 Holding piece
237*a* Holding claw (Provisional holding mechanism)
337 Holding piece
337*a* Curved shape portion (Provisional holding mechanism)

What is claimed is:

1. A connector with substrate, comprising:
a substrate including terminals;
a compression connector disposed on and pressed against the substrate to be connected to the substrate, the compression connector including
contacts that are in contact with the terminals on the substrate,
a housing to which the contacts are fixed, and
a cover shell that covers an upper surface portion of the housing and that includes a lock piece having a lock claw;
a cage fixed to the substrate and having a lock hole;
a provisional holding mechanism provisionally holding the compression connector on the substrate; and
a regular connection mechanism, after the compression connector is provisionally held on the substrate by the provisional holding mechanism, regularly connecting the compression connector to the substrate, wherein
the provisional holding mechanism includes
the lock claw of the lock piece formed on the cover shell of the compression connector, and
the lock hole formed in the cage, in which the lock claw is housed;
the compression connector is provisionally held by engagement of the lock claw and the lock hole when the compression connector is inserted into the cage fixed to the substrate; and
the regular connection mechanism that regularly connects the substrate and the compression connector is performed by screws.

2. The connector with substrate according to claim 1, wherein the cover shell includes a projection for strengthening against deformation.

3. The connector with substrate according to claim 1, wherein the cover shell includes a reinforcement plate for strengthening against deformation.

4. The connector with substrate according to claim 1, wherein the lock piece fixes a front surface side or a side surface side of the compression connector.

5. The connector with substrate according to claim 1, wherein at least one of the screws is disposed at any position on the compression connector.

6. The connector with substrate, comprising:
a substrate including terminals and a holding hole;
a compression connector disposed on and pressed against the substrate to be connected to the substrate, the compression connector including
contacts that are in contact with the terminals on the substrate,
a housing to which the contacts are fixed, and a cover shell that covers an upper surface portion of the housing and that includes a holding piece;

a provisional holding mechanism provisionally holding the compression connector on the substrate; and a regular connection mechanism, after the compression connector is provisionally held on the substrate by the provisional holding mechanism, regularly connecting the compression connector to the substrate, wherein the provisional holding mechanism includes the holding piece formed on the cover shell of the compression connector to control a position in a vertical direction with respect to the substrate, and the holding hole formed in the substrate, into which the holding piece is inserted; and the regular connection mechanism that regularly connects the substrate and the compression connector is performed by screws.

7. The connector with substrate according to claim 6, wherein the holding piece has a U shape or an L shape and projects from the cover shell, and a holding claw is formed at a distal end on a projection side of the U shape or the L shape, and the holding claw is caught in the holding hole formed in the substrate to receive contact reaction in the vertical direction applied to the substrate.

8. The connector with substrate according to claim 6, wherein the holding piece projects from a top surface of the cover shell in the vertical direction toward an opposite side of the substrate and bent in a reverse U shape to locate a distal end of the holding piece at a substrate side, and a holding claw is formed at the distal end, and the holding claw is caught in the holding hole formed in the substrate to receive contact reaction in the vertical direction applied to the substrate.

9. The connector with substrate according to claim 6, wherein the cover shell includes a protrusion for strengthening against deformation.

10. The connector with substrate according to claim 6, wherein the cover shell includes a reinforcement plate for strengthening against deformation.

11. The connector with substrate according to claim 6, wherein the holding piece is bent in an L shape from a top surface of the cover shell toward the substrate to locate a distal end of the holding piece at a substrate side, and a curved shape portion is formed at the distal end, and the curved shape portion is fit in the holding hole of the substrate to receive contact reaction in the vertical direction applied to the substrate.

12. The connector with substrate according to claim 1, wherein the compression connector includes a bottom shell that covers a lower surface portion of the housing.

13. The connector with substrate according to claim 1, wherein each of the contacts includes a spring portion having spring elasticity at an end thereof and projecting downwardly from a bottom surface of the housing, and the spring portion is pushed into the housing and spring force is applied to press against the substrate when the compression connector is held on the substrate.

* * * * *